(12) United States Patent
Riha et al.

(10) Patent No.: US 11,745,423 B2
(45) Date of Patent: Sep. 5, 2023

(54) METHOD AND APPARATUS FOR ADDITIVE MANUFACTURING

(71) Applicant: RapidFlight Holdings, LLC, Manassas, VA (US)

(72) Inventors: David Riha, Knoxville, TN (US); Alexis Fiechter, Mesa, AZ (US); Robert Bedsole, Knoxville, TN (US); Charles Hill, Topton, NC (US); Timofei Novikov, Friendsville, TN (US); Kyle Rowe, Knoxville, TN (US)

(73) Assignee: RapidFlight Holdings, LLC, Manassas, VA (US)

( * ) Notice: Subject to any disclaimer, the term of this patent is extended or adjusted under 35 U.S.C. 154(b) by 536 days.

(21) Appl. No.: 16/392,468

(22) Filed: Apr. 23, 2019

(65) Prior Publication Data

US 2019/0322047 A1 Oct. 24, 2019

Related U.S. Application Data

(60) Provisional application No. 62/661,553, filed on Apr. 23, 2018, provisional application No. 62/661,903, filed on Apr. 24, 2018.

(51) Int. Cl.
*B29C 64/245* (2017.01)
*B29C 64/379* (2017.01)
(Continued)

(52) U.S. Cl.
CPC ......... *B29C 64/245* (2017.08); *B29C 64/379* (2017.08); *B33Y 10/00* (2014.12);
(Continued)

(58) Field of Classification Search
CPC ... B29C 64/118; B29C 64/106; B29C 64/245; B22F 10/40
See application file for complete search history.

(56) References Cited

U.S. PATENT DOCUMENTS 5,593,633 A * 1/1997 Dull .................. B29C 70/44
156/285
5,939,008 A 8/1999 Comb et al.
(Continued)

FOREIGN PATENT DOCUMENTS

| CN | 106626369 A | 5/2017 |
|---|---|---|
| CN | 107097424 A | 8/2017 |

(Continued)

OTHER PUBLICATIONS

English Translation of Naruse (JP 2018034336) (Year: 2018).*
(Continued)

*Primary Examiner* — Hana C Page
(74) *Attorney, Agent, or Firm* — Polsinelli PC

(57) ABSTRACT

Methods and apparatus for additive manufacturing. In a method for additive manufacturing, a build sheet can be positioned on a print substrate of a printer. An object can be printed on the build sheet. The object can be detached from the build sheet. Advantageously, the build sheet can prevent the object from shifting on the build sheet during printing. Removing the build sheet from the object does not result in significant deformation or bending of the object. Damage to the object can be prevented. The object does not require additional cleaning or finishing for removing any residual or material. The build sheet can be ready for reuse. The build sheet can advantageously have mechanical strength to sustain removal of the build sheet from the object.

20 Claims, 21 Drawing Sheets

(51) Int. Cl.
  *B33Y 30/00* (2015.01)
  *B33Y 10/00* (2015.01)
  *B33Y 70/00* (2020.01)
  *B29K 69/00* (2006.01)
  *B29K 55/02* (2006.01)

(52) U.S. Cl.
  CPC .............. *B33Y 30/00* (2014.12); *B33Y 70/00* (2014.12); *B29K 2055/02* (2013.01); *B29K 2069/00* (2013.01)

(56) References Cited

U.S. PATENT DOCUMENTS

| | | | |
|---|---|---|---|
| 7,056,567 B2 | 6/2006 | O'Neill et al. | |
| 7,127,309 B2 * | 10/2006 | Dunn | B29C 64/40 700/98 |
| 8,994,592 B2 * | 3/2015 | Scott | B33Y 30/00 343/700 MS |
| 9,399,320 B2 | 7/2016 | Johnson et al. | |
| 9,815,268 B2 | 11/2017 | Mark et al. | |
| 10,286,599 B2 | 5/2019 | Jones | |
| 10,322,530 B2 | 6/2019 | Kawabe | |
| 10,369,742 B2 | 8/2019 | Scribner et al. | |
| 10,442,003 B2 | 10/2019 | Symeonidis et al. | |
| 10,967,576 B2 | 4/2021 | Fiechter et al. | |
| 2005/0208168 A1 | 9/2005 | Hickerson et al. | |
| 2011/0241947 A1 | 10/2011 | Scott et al. | |
| 2012/0115379 A1 * | 5/2012 | Kim | B29C 65/1458 442/1 |
| 2012/0323345 A1 | 12/2012 | Jonas et al. | |
| 2014/0333011 A1 | 11/2014 | Javidan et al. | |
| 2015/0024169 A1 | 1/2015 | Martin | |
| 2015/0048555 A1 | 2/2015 | Nagasaki et al. | |
| 2015/0061170 A1 | 3/2015 | Engel et al. | |
| 2015/0291921 A1 | 10/2015 | Rives | |
| 2016/0039194 A1 * | 2/2016 | Cable | B29C 64/106 428/195.1 |
| 2016/0136895 A1 | 5/2016 | Beyer et al. | |
| 2016/0176118 A1 | 6/2016 | Reese et al. | |
| 2016/0185041 A1 | 6/2016 | Lisagor et al. | |
| 2016/0193791 A1 * | 7/2016 | Swanson | B29C 64/40 264/408 |
| 2016/0207263 A1 | 7/2016 | Gordon | |
| 2016/0221261 A1 | 8/2016 | Yamamoto et al. | |
| 2016/0332382 A1 | 11/2016 | Coward et al. | |
| 2016/0332387 A1 | 11/2016 | Jondal et al. | |
| 2017/0036403 A1 | 2/2017 | Ruff et al. | |
| 2017/0037674 A1 | 2/2017 | Hooper et al. | |
| 2017/0073280 A1 | 3/2017 | Jones | |
| 2017/0144242 A1 | 5/2017 | McQueen et al. | |
| 2017/0182562 A1 | 6/2017 | Das et al. | |
| 2017/0182712 A1 | 6/2017 | Scribner et al. | |
| 2017/0217105 A1 | 8/2017 | Taniuchi | |
| 2017/0252980 A1 * | 9/2017 | Kelley | B32B 27/12 |
| 2017/0297320 A1 | 10/2017 | Swanson | |
| 2017/0305034 A1 | 10/2017 | Grivetti et al. | |
| 2017/0312986 A1 | 11/2017 | Qian | |
| 2018/0009172 A1 | 1/2018 | Amba et al. | |
| 2018/0099452 A1 | 4/2018 | Ochi et al. | |
| 2018/0117833 A1 | 5/2018 | Nagahari et al. | |
| 2018/0154441 A1 | 6/2018 | Miller et al. | |
| 2018/0182532 A1 | 6/2018 | Stahr et al. | |
| 2018/0207863 A1 | 7/2018 | Porter et al. | |
| 2018/0311891 A1 | 11/2018 | Duty et al. | |
| 2019/0047221 A1 * | 2/2019 | Baltes | B29C 64/106 |
| 2019/0077081 A1 | 3/2019 | Susnjara et al. | |
| 2019/0092978 A1 | 3/2019 | Ogino et al. | |
| 2019/0224909 A1 | 7/2019 | Riha et al. | |
| 2019/0240934 A1 | 8/2019 | Prins et al. | |
| 2020/0024414 A1 | 1/2020 | Ichino et al. | |
| 2021/0039315 A1 * | 2/2021 | Ciscon | B29C 64/245 |

FOREIGN PATENT DOCUMENTS

| | | |
|---|---|---|
| CN | 206884186 U | 1/2018 |
| EP | 3238865 A1 | 11/2017 |
| FR | 2998209 A1 | 5/2014 |
| JP | 2012024920 A | 2/2012 |
| JP | 2015131469 A | 7/2015 |
| JP | WO2015/049834 A1 | 8/2016 |
| JP | 2017171958 A | 9/2017 |
| JP | WO2017/159349 | 9/2017 |
| JP | 2018/062062 A | 4/2018 |
| KR | 10-2016-0128657 A | 11/2016 |
| KR | 10-2017-0004469 | 1/2017 |
| WO | WO 99/37454 A1 | 7/1999 |
| WO | WO 2013/136096 A1 | 9/2013 |
| WO | 2016136166 A1 | 9/2016 |
| WO | WO 2017/049155 A1 | 3/2017 |
| WO | 2017078168 A1 | 5/2017 |
| WO | 2017106965 A1 | 6/2017 |
| WO | WO 2017/172574 A1 | 10/2017 |
| WO | WO 2017/180958 A2 | 10/2017 |

OTHER PUBLICATIONS

Office Action, Application No. 10-2020-7027227, dated Jun. 24, 2021.
WO, International Search Report & Written Opinion, Application No. PCT/US2019/036603, dated Sep. 3, 2019.
WO, International Search Report & Written Opinion, Application No. PCT/US2019/028775, dated Jan. 17, 2020.
International Search Report and Written Opinion, dated Feb. 18, 2019 for PCT/US2018/060127 (15 pgs.).
International Search Report and Written Opinion, dated Nov. 8, 2019, for PCT/US2019/046191 (13 pages).
Chinese language 2nd Office Action dated Aug. 12, 2022 for CN 20198009811.7 (6 pages).
Japanese-language Office Action, and English-language translation, for JP patent application 2020-261590 dated Dec. 8, 2021 (9 pages).
Chinese language 2nd Office Action dated Jan. 5, 2022 for CN 201980014512.4 (3 pages).
Canadian Examiner's Report dated Feb. 16, 2022 for CA patent application No. CA3100846 (4 pages).
Chinese language 1st Office Action and Search Report dated Feb. 8, 2022 for CN 201980038575.3 (7 pages).
Korean language Decision of First Refusal, with English language translation, dated Apr. 27, 2022 for 10-2020-7034143 (7 pages).
Chinese language 1st Office Action dated Nov. 17, 2021 for CN 20198009811.7 (8 pgs.).
International Search Report and Written Opinion, dated Jul. 31, 2019, for PCT/US2019/018806 (11 pgs.).
International Search Report and Written Opinion for PCT/US2019/046191 dated Nov. 8, 2019 (13 pages).
Chinese language 1st Office Action dated Nov. 21, 2021 for CN 201980027421 4 (11 pages).
Chinese language 1st Office Action dated Jun. 25, 2021 for CN 201980014512.4 (10 pages).
Bales et al., "Design and Use of a Penetrating Deposition Nozzle for Z-Pinning Additive Manufacturing," Oak Ridge National Lab. (ORNL), Oak Ridge, TN (United States), 2022 (20 pages).
KR, Office Action, Application No. 10-2020-7034143, dated Oct. 26, 2021.
Chinese language 2nd Office Action, with English language translation, dated Dec. 1, 2022 for CN patent application No. CN 201980038575.3 (8 pages).
Chinese language 2nd Office Action, with English language translation, dated Dec. 1, 2022 for CN patent application No. CN 201980027421.4 (15 pages).

* cited by examiner

METHOD AND APPARATUS FOR ADDITIVE MANUFACTURING

CROSS-REFERENCE TO RELATED APPLICATIONS

This application claims priority to U.S. provisional patent application, Ser. No. 62/661,553, filed on Apr. 23, 2018 and U.S. provisional patent application Ser. No. 62/661,903, filed on Apr. 24, 2018. Priority to the provisional patent applications is expressly claimed, and the disclosure of the provisional applications is hereby incorporated herein by reference in its entirety and for all purposes.

CROSS-REFERENCE TO RELATED NONPROVISIONAL APPLICATIONS

The following Patent Cooperation Treaty (PCT) patent application is fully owned by the assignee of the present application and is filed on the same date herewith. The disclosure of the PCT patent application is hereby incorporated herein by reference in its entirety and for all purposes:
"METHOD AND APPARATUS FOR ADDITIVE MANUFACTURING," Ser. No. 16/392,468, filed on Apr. 23, 2019.

FIELD

The disclosed embodiments relate generally to additive manufacturing and more particularly, but not exclusively, to methods and apparatus for additive manufacturing.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. In typical additive manufacturing processes, a 3D object is created by forming layers of material under computer control. While the first three-dimensional (3D) printed articles were generally models, the industry is quickly advancing by creating 3D printed articles that may be functional parts in more complex systems, such as hinges, tools, structural elements.

Additive manufacturing for making a 3D article on a large scale (i.e., typically with at least one dimension greater than 5 feet) can be referred to as large-scale additive manufacturing. A system (or technique) for large scale additive manufacturing can be referred to as large scale additive manufacturing system (or technique). Exemplary large scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. Exemplary systems that use extrusion deposition for large scale additive manufacturing include the BAAM 100 ALPHA and the LSAM machine.

Large-scale additive manufacturing has recently become an area of greater research, use, and technology advancement because of improvements in material properties and increased needs of customized large structures. For example, Local Motors located in Phoenix, Ariz. was the first to use large-scale additive manufacturing, or large-scale extrusion deposition, to print a vehicle. However, large-scale additive manufacturing also faces great challenges that cannot be resolved by directly adopting technology used in smaller-scale additive manufacturing. One of the challenges is providing a suitable print surface to print on.

For example, in a 3D printing process based on extrusion deposition, the print surface needs to hold onto the initial printing layers without allowing the layers to slide. The print surface also needs to adhere strongly enough to the printed 3D object to prevent the 3D object from moving, throughout the duration of printing, as the 3D object thermally contracts or expands. Furthermore, the print surface should allow separation from the 3D object without damaging the 3D object. Existing print surfaces often require much time and labor to set up, cannot provide desired adhesion, and are difficult to reuse.

The print surface needs to be selected such that adhesion between the print surface and the initial printed layers is appropriate. The inventors of the present application have found that, when the adhesion is too weak, the print surface cannot prevent the printed layers from shifting or sliding and can result in printing errors.

The inventors have found that, when the adhesion is too strong, the print surface cannot be separated from the object without damaging or contaminating the object. In addition, during printing, each printed layer can experience a certain amount of deformation due to thermal contraction. When the adhesion is very strong, stress built up within the printed layers can forcefully and abruptly overcome the adhesion of the printed object to the print surface and result in deformation of different degrees for each of the printed layers. The object with such a deformation can appear poorly shaped. Certain deformation of the object can reduce distance between the object and the print head during printing, and width of a bead subsequently deposited on the object can be increased, resulting in a print defect.

The inventors have found that, although smaller-scale additive manufacturing may encounter the difficulty of setting up the suitable print surface, the difficulty can be especially severe and present unique challenges in large-scale additive manufacturing. For example, in small-scale additive manufacturing, the print substrate can be coated with gluestick or painter's tape, and such coating can be time-consuming and impractical on the large-scale. Furthermore, in a large-scale extrusion deposition process, solidification of the bead can take a long time. Therefore, each printed layer can have respective solidification progress. In addition, size of the printed layers is large, so amount of relative deformation between adjacent layers is large. Stress built up between the adjacent layers can be significant.

In one example, the inventors have covered the print bed with an acrylonitrile butadiene styrene (ABS) sheet and have pulled a vacuum applied via the print bed. By being attached to the print bed that is actively heated, the ABS sheet can be heated and adhere to the object during printing. However, the print bed can be hot when being heated, making it difficult to place the ABS sheet down or walk on during large-scale additive manufacturing.

The inventors have found that, for large prints, single ABS sheets may not be commercially available in a large enough size. Therefore, multiple ABS sheets may need to be taped side by side to create a full print surface. For example, adhesive tape, such as electric tape, can be used for the taping. Such taping can leave uneven gaps on large prints and can result in deformation of the layers of the object proximal to the print bed and may cause print quality problems for layers distal to the print bed if the object does not adhere to the adhesive tape. Thinner ABS sheets may be commercially available in rolled form. However, thick ABS sheets are often used in order to prevent or minimize ABS sheets from deforming under high stress during printing.

The inventors have further found that, when being heated and being pulled by vacuum, the ABS sheet can lose vacuum, and loss of vacuum can make the object move during printing. For example, after deformation occurs in the object and in the ABS sheet attached to the object during printing, the ABS sheet can slip away from the vacuum seal tape, resulting in a loss of vacuum. The print bed can be kept at just above the glass transition temperature Tg of the ABS sheet, so if the ABS sheet lifts off of the print bed by approximately ¼ inch due to the thermal contraction of the attached object, the ABS sheet can enter the glassy state and no longer flow in response to the vacuum force that previously held the ABS sheet flat to the print bed. The ABS sheet can contract enough to pull out from under a vacuum seal tape that is previously used for fixing the ABS sheet to the print bed, resulting in a loss of vacuum and therefore allowing the object to move during printing. Any rotation or translation of the object during printing will result in defects in the final printed object even if printing of the object is able to be completed.

In another example, the inventors have found that a board, such as a wood particle board, can be coated with glue, such as wood glue. Plastic pellets can be spread over the wood glue. The roughness introduced by the pellets helps to hold the object in place during printing. However, in large-scale additive manufacturing, spreading the pellets over the board can be time consuming. Additionally, when the object is removed from the board, large amounts of pellets can fall to the ground, resulting in a mess. Furthermore, the board cannot be easily reused due to the lost pellets.

Therefore, for providing the print surface, the problem in large-scale additive manufacturing is different from and/or greater than the problem in smaller-scale additive manufacturing. Further, certain methods for solving the problem in large-scale additive manufacturing may not be effective or practical.

In view of the foregoing, there is a need for improvements and/or alternative or additional solutions to improve methods and apparatus for additive manufacturing and to produce print surfaces that overcome drawbacks of existing solutions.

Figure 1:
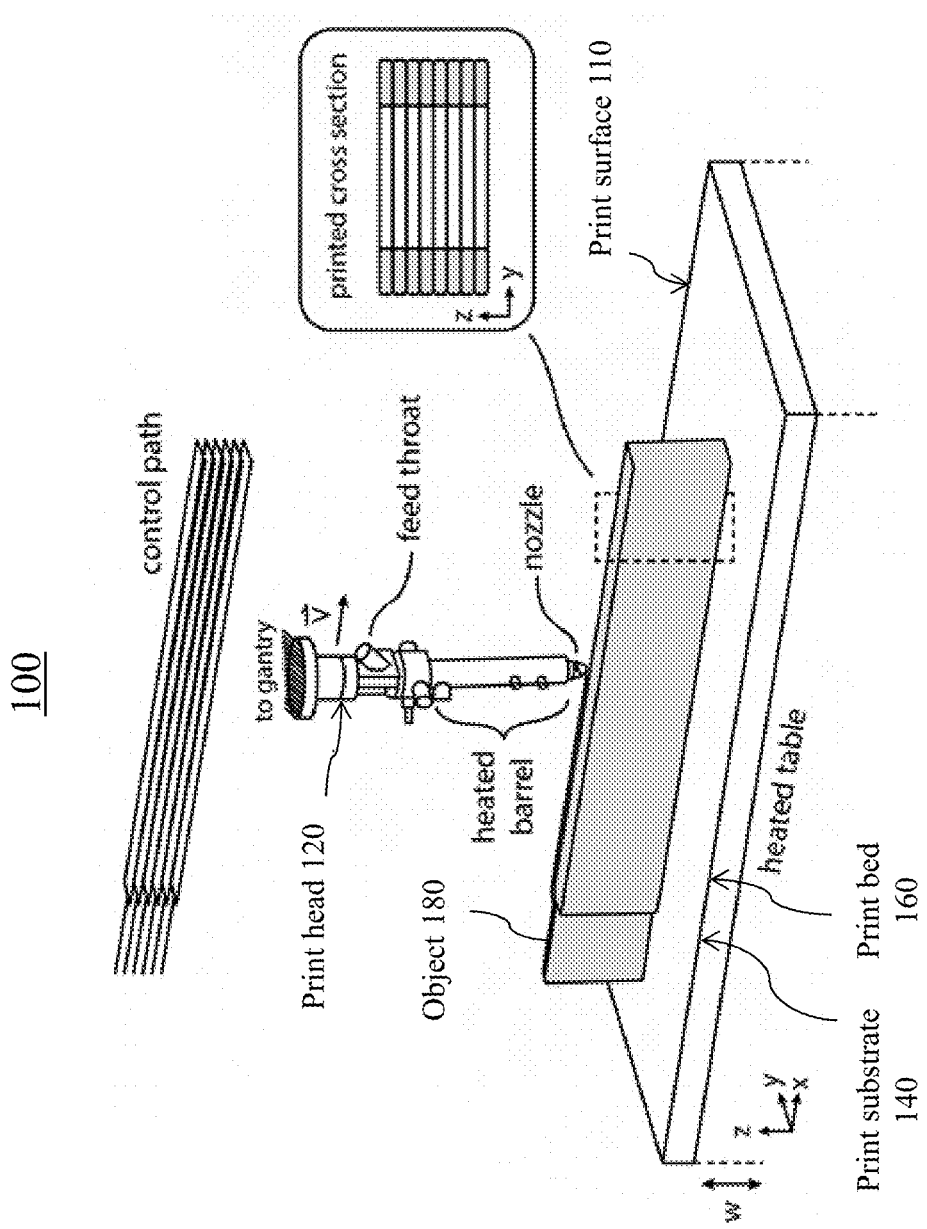
FIG. 1 is an exemplary diagram illustrating an embodiment of a system for additive manufacturing.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

FIG. 1 shows an exemplary system 100 for additive manufacturing. The system 100 can print an object 180 via extrusion deposition (or material extrusion). A print head 120 is shown as including a nozzle configured to deposit one or more polymer layers onto a print substrate 140 to form the object 180. The print substrate 140 is shown in FIG. 1 as providing a print surface 110 for receiving initial printed material deposited from the print head 120.

The print substrate 140 is shown as including a print bed 160. The print bed 160 can provide a uniform or flat surface. The print bed 160 can include a heated and/or unheated table. The stacking direction of the layers is z-direction and the printing direction is the x-direction.

Although FIG. 1 shows additive manufacturing as being implemented by the system 100 using extrusion deposition, any other systems or processes for additive manufacturing can be used in the present disclosure. Exemplary processes for additive manufacturing can include binder jetting, directed energy deposition, material jetting, powder bed fusion, sheet lamination, photopolymerization, vat photopolymerization, stereolithography, or a combination thereof.

Since currently-available methods and systems are incapable of providing a reliable print surface with appropriate adhesion and easy to prepare and reuse, methods and apparatus for additive manufacturing that provide the suitable print surface 110 can prove desirable and provide a basis for a wide range of applications, such as additive manufacturing for vehicles and/or architectural structures.

Although the apparatus and methods as set forth in the present disclosure are applied to solve technical problems in large-scale additive manufacturing, the apparatus and methods can be applied to any smaller-scale additive manufacturing, such as medium-scale and/or small-scale additive manufacturing, without limitation.

Figure 2:
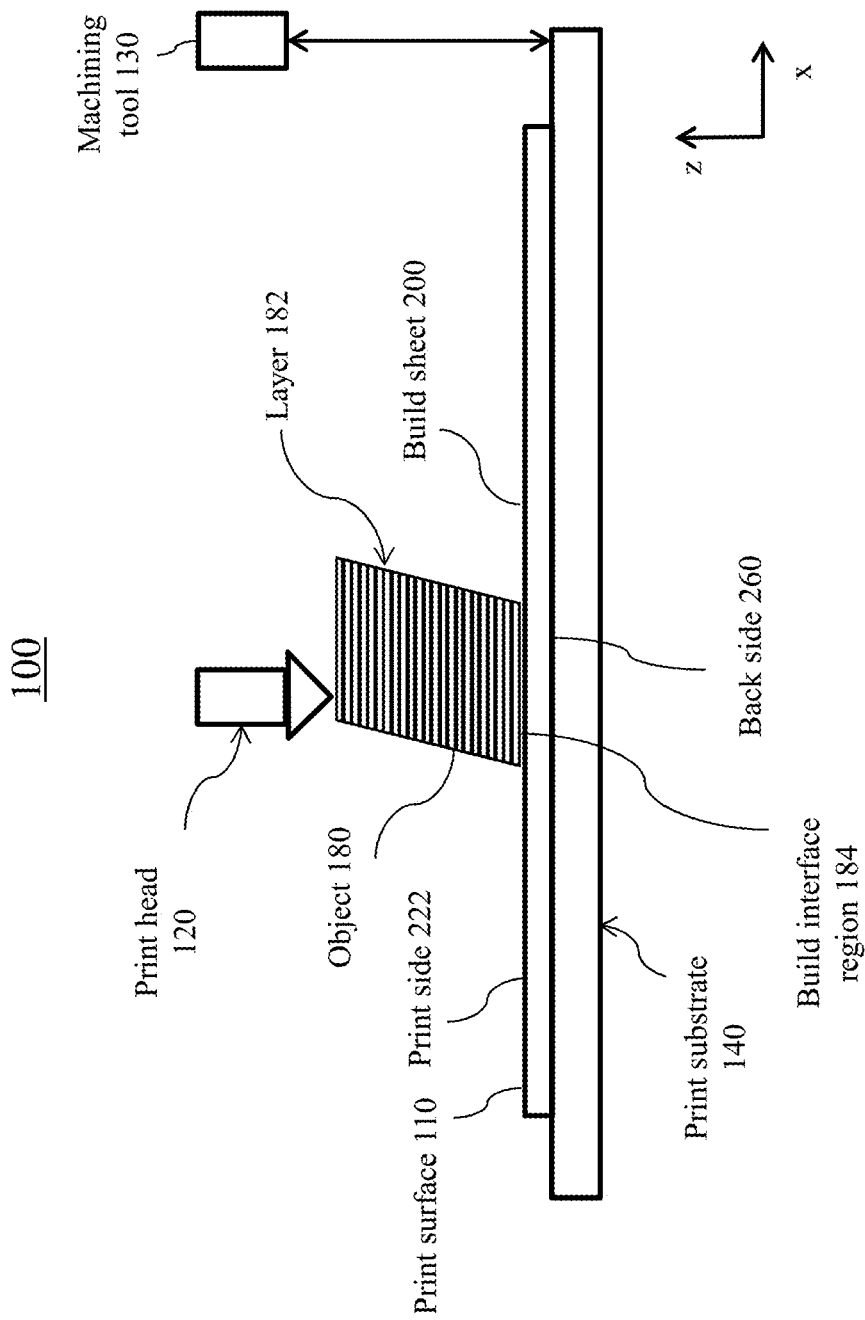
FIG. 2 is an exemplary diagram illustrating an alternative embodiment of the system of FIG. 1 during additive manufacturing, wherein the system includes a build sheet.

Turning to FIG. 2, an exemplary system 100 is shown. The system 100 is shown as including the print substrate 140 and a build sheet 200 disposed on the print substrate 140. The build sheet 200 can be positioned on the print substrate 140 prior to printing of the object 180. The build sheet 200 can be fixed in position relative to the print substrate 140 in any suitable manner. The build sheet 200 is shown as including a print side 222 that serves as the print surface 110 and a back side 260 that is opposite to the print side 222 and in contact with the print substrate 140. The print head 120 can print the object 180 on the build sheet 200. The object 180 is shown as including one or more layers 182 being stacked in the z direction. The object 180 can be manufactured using additive manufacturing.

Figure 19:
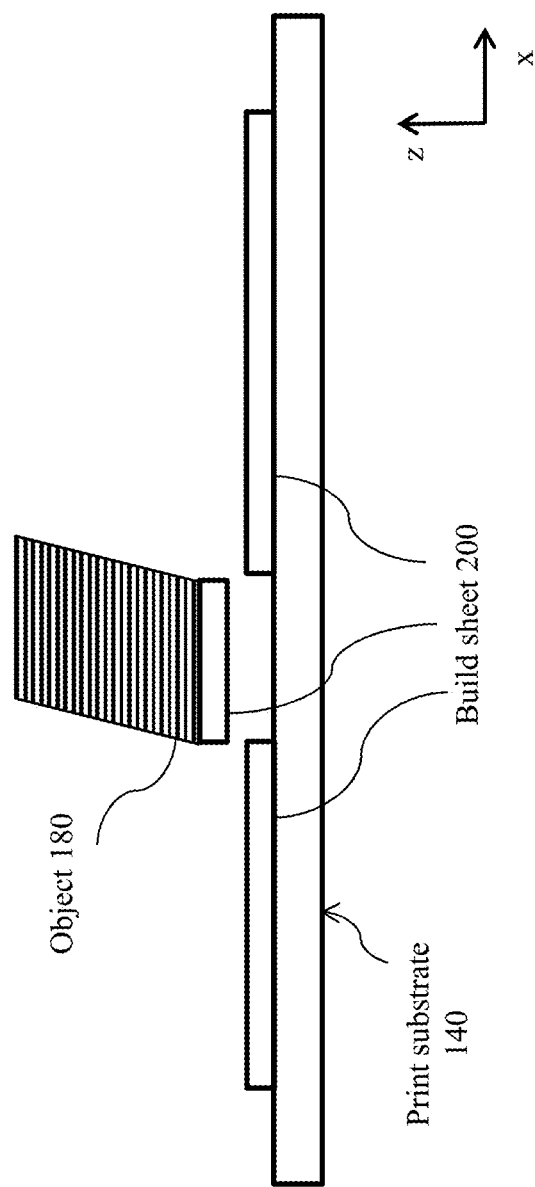
FIG. 19 is an exemplary diagram illustrating another alternative embodiment of the system of FIG. 2 during manufacturing, wherein the build sheet is cut.

The system 100 is shown as including an optional machining tool 130. The machining tool 130 can remove a selected portion of the object 180 during and/or after printing of the object 180. Exemplary machining tool 130 can include a mill, lathe, any type of cutting machine, or a combination thereof. The machining tool 130 can be installed at any suitable location of the system 100. FIG. 2 shows the machining tool 130 as being directly and/or indirectly connected to the print bed 160 for illustrative purposes only. The print head 120 and the machining tool 130 can be controlled by uniform and/or different control systems 400 (shown in FIG. 19).

Adhesion between the print surface 110 and the object 180 can be sufficiently strong such that the object 180 does not shift along the print surface 110. Stated somewhat differently, the layers 182 that are initially deposited and interface with the print surface 110 can be at least partially adhered to the print surface 110 such that the print surface 110 can hold the object 180 in place during printing.

Although FIG. 2 shows a cross section of the part in z- and x-directions, the build sheet 200 can be visible in a cross section of the part in z- and y-directions in a uniform and/or different manner, without limitation.

Figure 3:
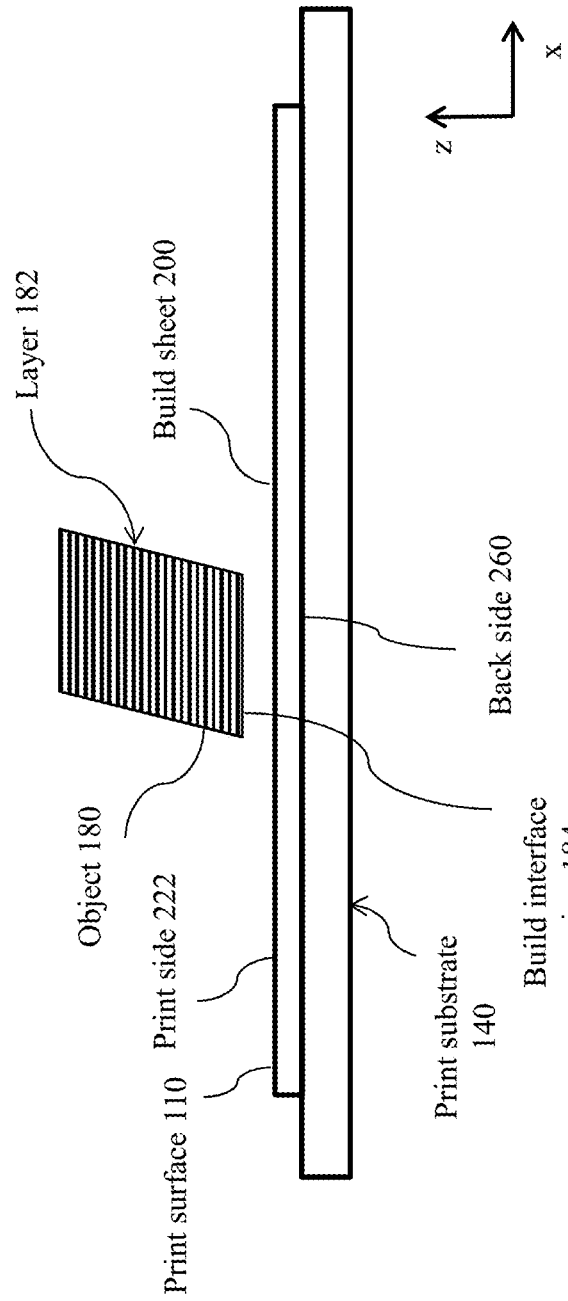
FIG. 3 is an exemplary diagram illustrating an alternative embodiment of the system of FIG. 2 during manufacturing, wherein an object is removed from the build sheet.

Turning to FIG. 3, the object 180 is shown as optionally being detached from the build sheet 200. Stated somewhat differently, the build sheet 200 can be detached from the object 180. Thus, the object 180 is removed from the print system 100. In one embodiment, upon completion of the printing of the object 180, the build sheet 200 can remain on the print substrate 140. A mechanical tool, in a shape such as a wedge, can slide between the build sheet 200 and the object 180 in a gradual manner to separate the object 180 from the build sheet 200. The object 180 can thus be removed from the build sheet 200 while the build sheet 200 can remain attached to the print substrate 140.

Although FIG. 3 shows the build sheet 200 as being located on the print substrate 140 for illustrate purposes only, the build sheet 200 can be in contact and/or separated from the print substrate 140 before, during, and/or after removal of the object 180 from the build sheet 200, without limitation.

Upon removal, none of, or a negligible amount of, residual adhesive and/or material from the build sheet 200 remains on the object 180. Stated somewhat differently, the build sheet 200 can remain undamaged during the removal. Advantageously, the object 180 does not require additional cleaning and/or finishing work for removing any residual and/or material, and the build sheet 200 can be ready for reuse.

Additionally and/or alternatively, adhesion between the build sheet 200 and the object 180 can be sufficiently weak such that the layers 182 that are initially deposited and interface with the print surface 110 can be allowed to be partially detached from the print surface 110 under stress caused by thermal contraction. Thus, stress can be relieved during printing in a gradual or steady manner. Advantageously, abrupt and non-uniform deformation of multiple layers 182 can be prevented.

Figure 4:
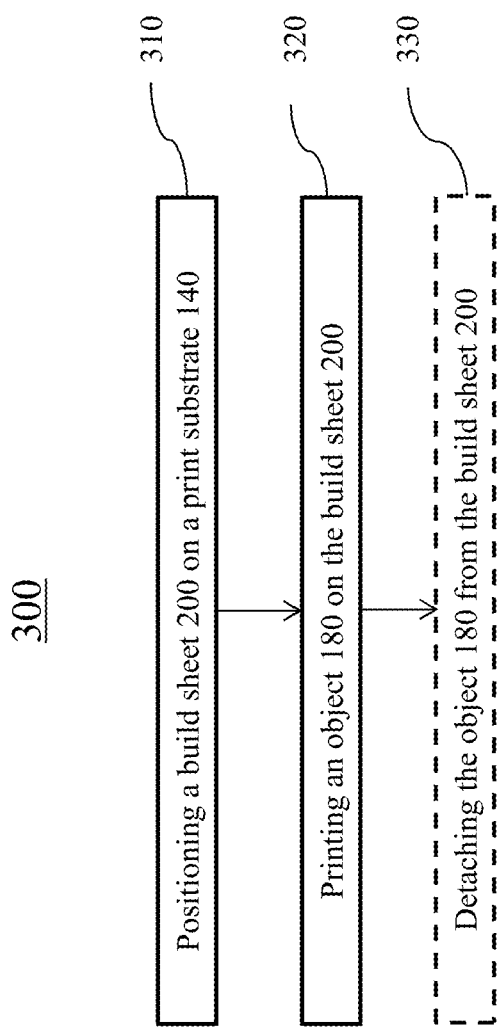
FIG. 4 is an exemplary top-level flow chart illustrating an embodiment of a method for additive manufacturing based on the system of FIG. 2.

Turning to FIG. 4, an exemplary method 300 for additive manufacturing is shown. The build sheet 200 can be positioned, at 310, on the print substrate 140. The object 180 can be printed, at 320, on the build sheet 200. The object 180 can optionally be detached, at 330, from the build sheet 200.

Advantageously, adhesion between the build sheet 200 and the object 180 can be sufficiently weak such that detaching the object 180 from the build sheet 200 does not require significant deformation and/or bending of the object 180. Damage to the object 180 can be prevented.

Figure 5:
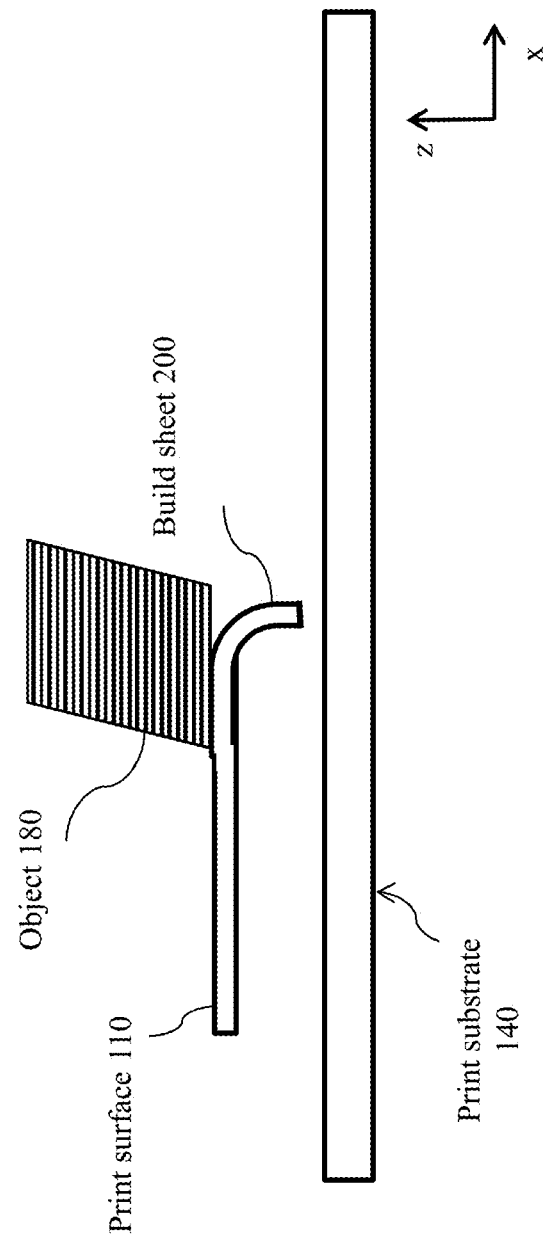
FIG. 5 is an exemplary diagram illustrating an alternative embodiment of the system of FIG. 2 during manufacturing, wherein the build sheet is being removed from an object.

Turning to FIG. 5, the build sheet 200 and the object 180 are shown as being released from the print substrate 140. In one embodiment, upon completion of the printing of the object 180, the build sheet 200 can be detached from the print substrate 140 and still be adhered to the object 180. Stated somewhat differently, the build sheet 200, being adhered to the object 180, can be released from the print substrate 140.

FIG. 5 shows the build sheet 200 as being flexible. Adhesion between the print surface 110 and the object 180 can be sufficiently weak such that the build sheet 200 can optionally be peeled off from the object 180. Stated somewhat differently, an operator and/or a machine can grip one side or one corner of the build sheet 200 and pull the build sheet 200 away from the object 180 in a gradual manner. The build sheet 200 can be rolled, bent, flexed and/or stretched during the removal without being broken. By being flexible, the build sheet 200 can advantageously be rolled up for storage and rolled out on the print substrate 140 for printing.

Figure 6:
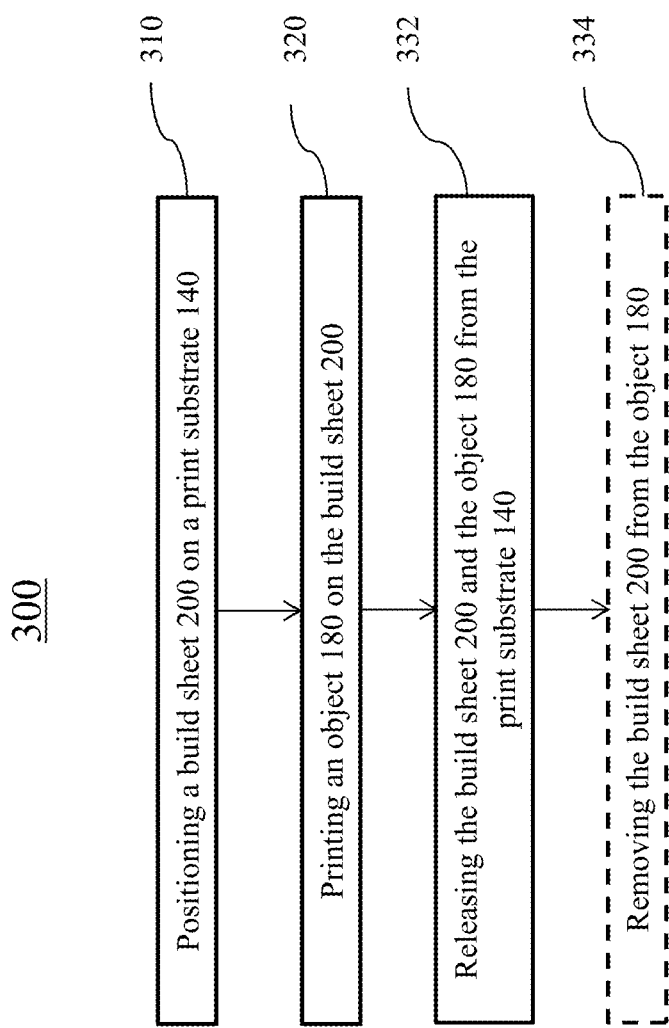
FIG. 6 is an exemplary flow chart illustrating an alternative embodiment of the method of FIG. 4.

Turning to FIG. 6, an exemplary flow chart of an alternative embodiment of the method 300 for additive manufacturing is shown. The build sheet 200 can be positioned, at 310, on the print substrate 140. The object 180 can be printed, at 320, on the build sheet 200. The object 180 and the build sheet 200 can be released, at 332, from the print substrate 140. The build sheet 200 can optionally be removed, at 340, from the object 180.

Advantageously, removing the build sheet 200 from the object 180 can be performed by peeling the build sheet 200 and does not require deformation and/or bending of the object 180. Damage to the object 180 can be prevented.

Figure 7:
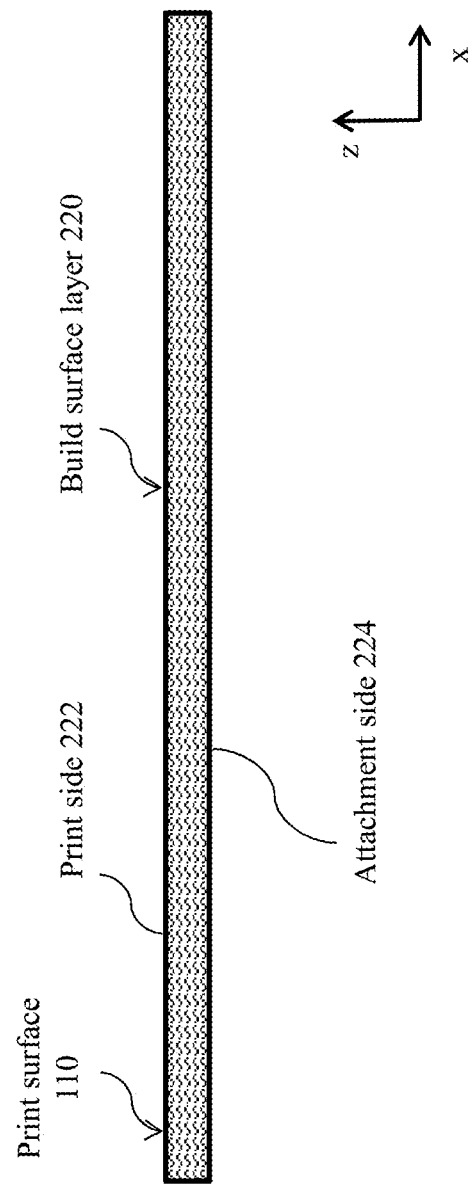
FIG. 7 is an exemplary cross-sectional diagram illustrating an embodiment of the build sheet of FIG. 2.

Turning to FIG. 7, an exemplary build sheet 200 is shown as including a build surface layer 220. The build surface layer 220 is shown as being a sheet having two sides including the print side 222 and an attachment side 224 that is opposite to the print side 222. The print side 222 can receive the object 180 (shown in FIG. 2). Stated somewhat differently, the print surface 110 can include the print side 222 and the object 180 can be in direct contact with the print side 222.

The build surface layer 220 can be made of any suitable material that can adhere to the object 180 during printing. After completion of printing, the build surface layer 220 can be removed from the object 180 without being broken.

In one embodiment, the attachment side 224 of the build surface layer 220 can be adhered to the print substrate 140 (shown in FIG. 2) prior to printing the object 180. After completion of printing, the build surface layer 220 can be removed from the print substrate 140 in any manner. For example, a wedge can be inserted between the build surface layer 220 and the print substrate 140 to release the build surface layer 220 from the print substrate 140.

In one embodiment, the build surface layer 220 can be flexible such that the build sheet 200 can be peeled from the object 180. The build surface layer 220 can have sufficient mechanical strength (for example, tensile strength, ultimate breaking strength, and/or breaking force) such that, a peeling force applied to the build surface layer 220 can overcome adhesion with the object 180 and does not tear or break the build surface layer 220. The adhesion between the build surface layer 220 and the object 180 can be provided by an adhesive integrated with the build surface layer 220.

In some embodiments, a breaking force of the build surface layer 220 can be measured using ASTM D5035-2C Standard Test Method for Breaking Force and Elongation of Textile Fabrics, using a 2-inch wide sample. A build surface layer 220 having a breaking force greater than 50 N can overcome a minimally required amount of adhesion with the object 180 without breaking.

The adhesion between the build surface layer 220 and the object 180 can be characterized by a peel strength measured using a 180° peel test. In some embodiments, the peel strength can range from 10 pound force/inch (lbf/in) to 1000 lbf/in. In a preferred embodiment, the peel strength can range from 50 lbf/in to 400 lbf/in to allow easy separation between the object 180 and the build surface layer 220 after printing and still ensure reliable adhesion during printing under printing conditions for printing a vehicle. Corresponding to the preferred range of the peel strength, the build surface layer 220 can have a breaking force greater than 100 N to overcome the adhesion with the object 180.

Thickness of an exemplary build surface layer 220 can range from 0.1 mm to 10 mm. In one embodiment, the thickness can range from 0.3 mm to 0.8 mm which can provide sufficient flexibility, strength and robustness. In another embodiment, the thickness can range from 1 mm to 10 mm.

Figures 8A, 8B:
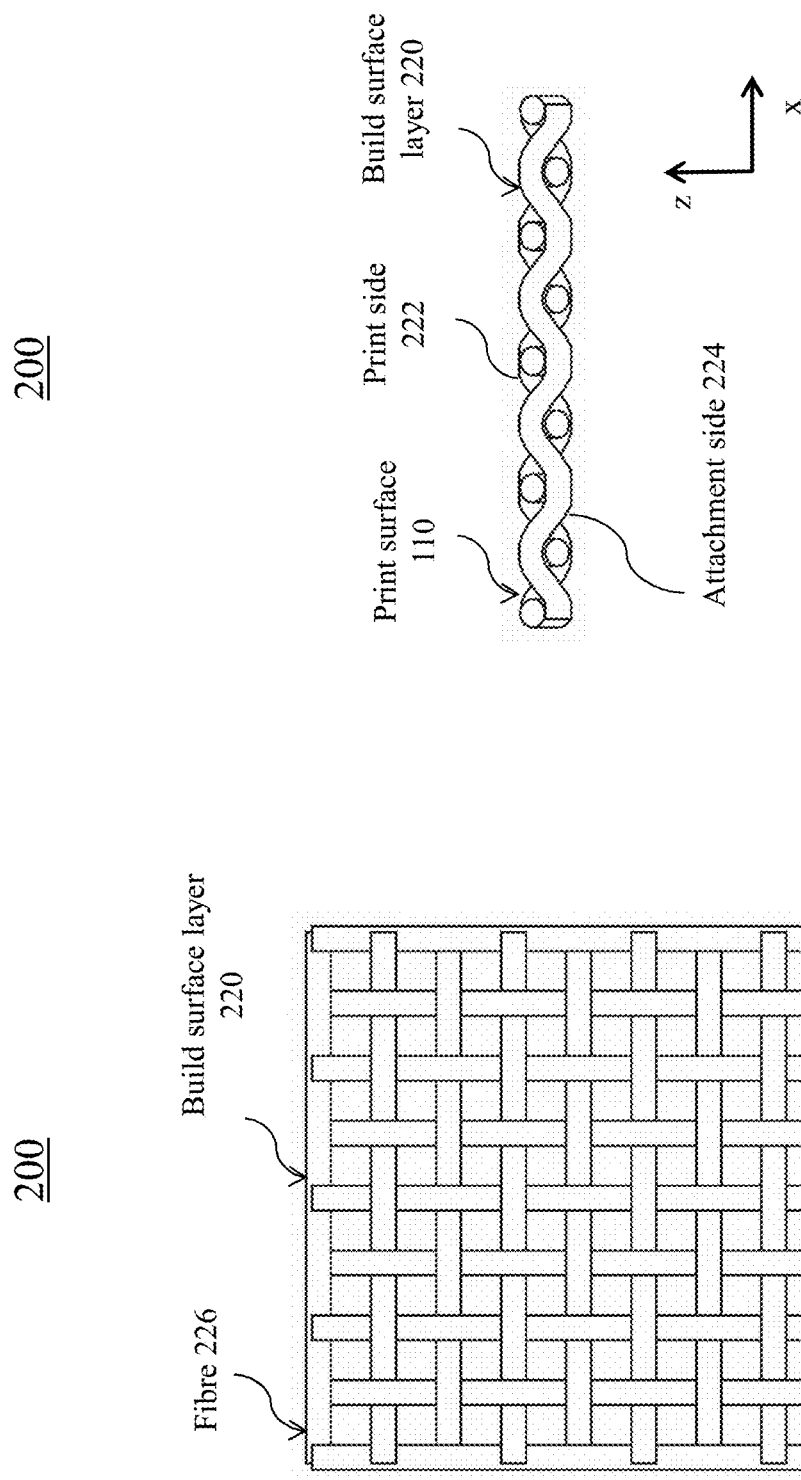
FIG. 8A is an exemplary detail drawing illustrating an alternative embodiment of the build sheet of FIG. 7.
FIG. 8B is an exemplary cross-sectional diagram illustrating the build sheet of FIG. 8A.

Turning to FIG. 8A, an exemplary top view of the build surface layer 220 is shown. The build surface layer 220 is shown as being made of a material including a textile. The textile can include any flexible material including a network of natural and/or artificial fibres 226. An exemplary fibre 226 can include yarn or thread. The textile can be formed by any suitable processes including, for example, weaving, knitting, crocheting, knotting, felting, matting, condensing, and/or pressing. The textile can include any organic textile, semi-synthetic textile, synthetic textile, woven textile, non-woven textile, or a combination thereof. Exemplary organic textile can include cotton, denim, canvas, duck canvas, linen, silk, wool, and/or the like. Exemplary semi-synthetic textile can include rayon and/or the like. The exemplary synthetic textile can include polyester, acrylic, polyamide, polymeric microfibers, and/or the like.

Although FIG. 8A shows the build surface layer 220 as having a woven structure for illustrative purposes only, the build surface layer 220 can have a woven and/or non-woven structure, without limitation. Although FIG. 8A shows the build surface layer 220 as including one layer of textile for illustrative purposes only, the build surface layer 220 can include any number of uniform and/or different textiles that are separated and/or interconnected, without limitation. Although FIG. 8A shows the build surface layer 220 as including fibres 226 being parallel or vertical to each other for illustrative purposes only, the build surface layer 220 can include fibres 226 with any angle and/or orientation relative to each other, without limitation.

The textile can advantageously have mechanical strength to sustain removal of the build surface layer 220 from the object 180 (shown in FIG. 2). The textile can advantageously provide a surface texture that can prevent the object 180 from shifting on the build surface layer 220. The texture of the build surface layer 220 can be imprinted on the object 180.

Turning to FIG. 8B, a cross section of the build surface layer 220 of FIG. 8A is shown. The print side 222 of the build surface layer 220 is shown as having a physical texture or roughness. The physical roughness can provide friction that prevents the object 180 (shown in FIG. 2) from shifting across the print side 222.

Additionally and/or alternatively, the build surface layer 220 can include an adhesive (not shown) at least partially integrated with the fibres 226 (shown in FIG. 8A). In one embodiment, the adhesive can permeate the fibres of the build surface layer 220. The adhesive can form a continuous coating (not shown) over the print side 222 of the build surface layer 220. Additionally and/or alternatively, the adhesive can form discrete patches across surface of the build surface layer 220. Additionally and/or alternatively, thickness of the adhesive that coats the build surface layer 220 can be small enough such that the adhesive does not reduce the physical roughness of the print side 222.

Exemplary adhesives can be resin-based, urethane-based, acrylate-based, butadiene-chloroprene-based, acrylic-based, neoprene-based, poly(vinyl alcohol)-based, or a combination thereof. For example, the adhesive can include any contact adhesive, wood glue, or a combination thereof. Exemplary contact adhesives can include natural rubber and/or polychloroprene (or neoprene). In one example, the contact adhesive can include 3M 30NF Contact Adhesive (available from 3M Company located in Maplewood, Minn., U.S.), 3M Fastbond Pressure Sensitive Adhesive 4224 NF, Clear (available from 3M Company), 3M Fastbond 30H Contact Adhesive (available from 3M Company), 3M Neoprene contact Adhesive 5, Neutral Sprayable (available from 3M Company). Exemplary wood glue can be poly(vinyl alcohol)-based or PVA-based. The adhesive can be coated on the print side 222 in any manner. For example, the textile can be soaked and/or saturated in the adhesive to be coated with the adhesive. Additionally and/or alternatively, the adhesive can be 3D printed and made of, for example, thermoplastic polyurethane (TPU). The textile can be embedded in the TPU during the 3D printing to form fiber-reinforced TPU.

The adhesive can provide adhesion between the object 180 and the build surface layer 220. The adhesion can be sufficient such that the object 180 can be at least partially adhered to the build surface layer 220 during printing. Additionally and/or alternatively, the build surface layer 220 can maintain flat shape under vacuum and/or under heat during printing. The adhesive provides the adhesion such that the object 180 can be allowed to deform to an extent that is determined by thermal contraction but the object 180 can still be at least partially adhered to the build surface layer 220 even if a part of the layers 182 (shown in FIG. 2) may detach from the build surface layer 220 due to the deformation. Advantageously, abrupt and non-uniform deformation of the layers 182 can be prevented.

For example, ABS sheet, if not being torn during peel testing, can have a high initial peel strength but the peel strength can drop off quickly (similar to initiating and then running a crack in a brittle material). In contrast, the adhesive as set forth above (for example, the contact adhesive) can have a more constant peel strength but lower initial strength. Additional information of peel strength and peel test methods are shown in Exhibit A.

The textile and the adhesive can be selected such that, during removal of the build surface layer 220 from the object 180, adhesion force between the build surface layer 220 and the object 180 can be weaker than the force required to break or tear the build surface layer 220. Stated somewhat differently, adhesion between the adhesive-coated textile and the object 180 can be weaker than the strength of the textile and weaker than the adhesion between the adhesive and the textile.

Figure 9:
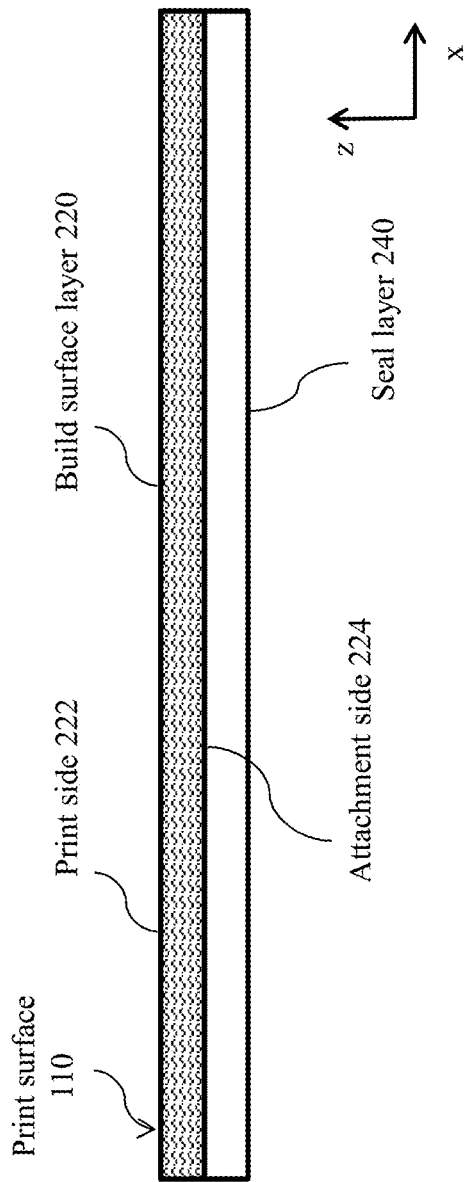
FIG. 9 is an exemplary cross-sectional diagram illustrating an alternative embodiment of the build sheet of FIG. 5, wherein the build sheet includes a seal layer.

Turning to FIG. 9, an exemplary build sheet 200 is shown as including an optional seal layer 240 fixedly attached to the attachment side 224 of the build surface layer 220. The seal layer 240 can serve as an intermediate layer that permits attachment of the build sheet 200 to the print substrate 140 (shown in FIG. 2). In one embodiment, the seal layer 240 can include a vacuum sealing sheet. An exemplary seal layer 240 can include a thermoplastic sheet, a sheet metal, and/or a thermoset sheet. An exemplary thermoplastic sheet can include an ABS sheet and/or a polyetherimide (PEI) sheet. Exemplary PEI sheet can be available from Saudi Basic Industries Corporation located in Riyadh, Saudi Arabia). Advantageously, even if the build surface layer 220 is not vacuum sealing, the seal layer 240 can allow the build sheet 200 to be fixed to the print substrate 140 via vacuum sealing.

In some embodiments, a thickness of an exemplary seal layer 240 can range from 0.1 mm to 10 mm. In a preferred embodiment, the thickness of the exemplary seal layer 240 can range from 0.6 mm to 1.6 mm. With the preferred range of thickness, the seal layer 240 is thick enough to avoid deformation under high temperature during printing and to avoid tearing during handling. In one example, the seal layer 240 is made of ABS and can be 1.5 mm thick because the ABS sheet has a tendency to warp and deform when hot material of the object 180 (shown in FIG. 2) is printed thereon. In another example, the seal layer 240 is made of PEI and can be 0.7 mm thick because PEI does not tend to thermally deform during printing.

The seal layer 220 is not in direct contact with the object 180 and does not have to be heated at high temperature, so deformation of the seal layer 220 is reduced and the seal layer 220 can be thinner than the ABS sheet that is used alone as the print surface 110. When a spacer platform 142 (shown in FIG. 12) is used, the seal layer 220 is not in contact with individual vacuum holes, so deformation is further prevented and the thickness of the seal layer 220 can be further reduced. Additionally and/or alternatively, because the build surface layer 220 provides additional thickness and robustness to the build sheet 200, the seal layer 240 can be thinner than ABS sheet used alone as the print surface 110, for example, and enables the seal layer 240 to be easily rolled up for storage. Further, when multiple seal layers 240 need to be placed side by side to cover the print substrate 140, the build surface layer 220 can mitigate any non-uniformity caused by gaps or overlapping between adjacent seal layers 240. Print quality can advantageously be improved.

Additionally and/or alternatively, without the build surface layer 220, an operator may need to attach the seal layer 240 to the print substrate 140 prior to printing. Such operation can be difficult for the operator because the print substrate 140 can be at elevated temperature in order to heat the seal layer 240 for the seal layer 240 to directly adhere to the object 180. In contrast, with the build surface layer 220, the build sheet 200 does not need to be attached to the print substrate 140 under high temperature and can advantageously reduce the effort required by the operator to attach the build sheet 200.

The build surface layer 220 can be attached to the seal layer 240 in any manner. In one embodiment, the adhesive (not shown) can be coated on the seal layer 240. The build surface layer 220 can be placed on the adhesive-coated seal layer 240. The adhesive can permeate the build surface layer 220 from the attachment side 224 to the print side 222. Additionally and/or alternatively, the build surface layer 220 can be hot pressed (or heat pressed) to the seal layer 240.

The build surface layer 220 can be attached to the seal layer 240 to form a uniform contact. Advantageously, voids between the build surface layer 220 and the seal layer 240 can be minimized or prevented, so heat generated from the object 180 during printing does not expand the voids and thus does not cause the build surface layer 220 to delaminate from the seal layer 240 or reduce uniformity of the print surface 110.

Figure 10:
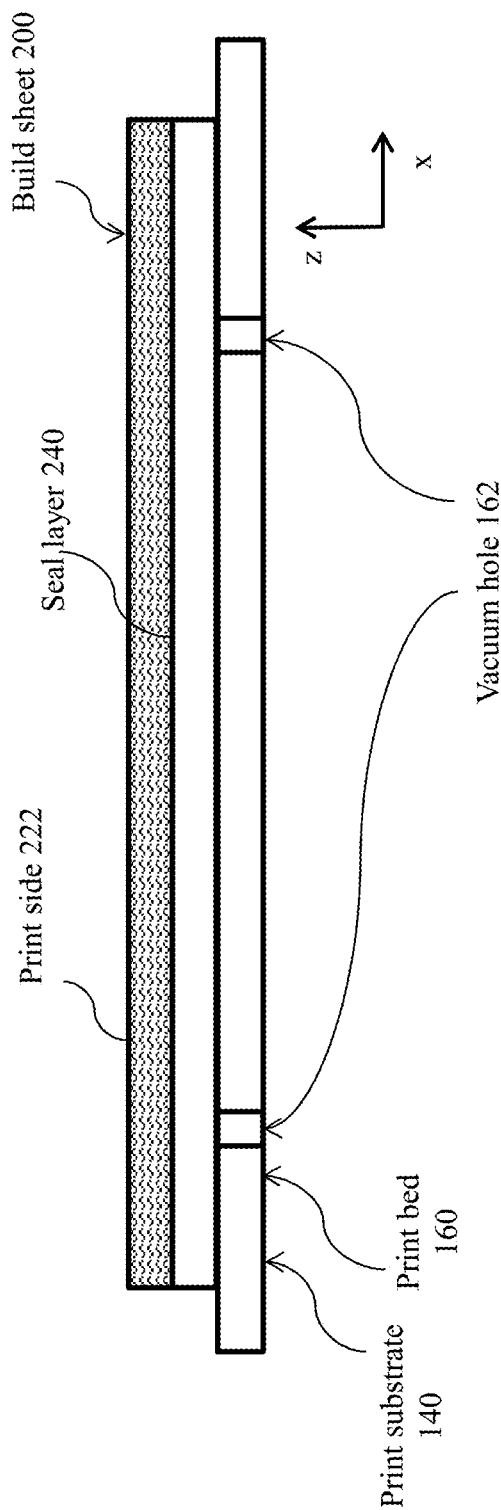
FIG. 10 is an exemplary diagram illustrating another alternative embodiment of the system of FIG. 2, wherein the system is configured to apply a vacuum to the build sheet.

Turning to FIG. 10, the build sheet 200 is shown as being positioned on the print substrate 140. The print substrate is shown as including the print bed 160. The print bed 160 is shown as including a vacuum table defining one or more vacuum holes 162. Vacuum can be applied to the build sheet 200 via the vacuum holes 162. Advantageously, the build sheet 200 can be uniformly fixed to the print bed 160 without an adhesive between the print bed 160 and the build sheet 200.

In one embodiment, prior to printing, the build sheet 200 can be positioned on the print bed 160. Relative position between the build sheet 200 and the print bed 160 can be fixed upon application of the vacuum. By turning off the vacuum, the build sheet 200 and the object 180 (shown in FIG. 2) can be released from the print bed 160. Advantageously, setting up the build sheet 200 on the print bed 160 and releasing of the build sheet 200 can be performed in a simple manner.

Additionally and/or alternatively, the build surface layer 220 can limit local deformations of the seal layer 240 at least partially due to the presence of the textile. Thus, risk of loss of vacuum due to contracting of the seal layer 240 can be mitigated. Because of the low initial peel strength of the adhesive (shown in Exhibit A), the adhesive used on the build surface layer 220 that contacts the object 180 can become detached from the object 180 before the seal layer 240 starts to significantly deform. Therefore, object 180 can start to lift off of the build surface layer 220 before significant global deformations result in vacuum loss.

Stated somewhat differently, by applying the vacuum, the build sheet 200 can be affixed to the print bed 160 without adhesive between the build sheet 200 and the print bed 160, which is advantageous for large scale additive manufacturing. In contrast, if vacuum is not used, a proper adhesive should be strong enough to hold the build sheet 200 to the print bed 160 by resisting high residual stress at interface between the build sheet 200 and the print bed 160 in large scale additive manufacturing. The adhesive should also be weak enough such that the build sheet 200 can be removed from the print bed 160. The adhesive meeting the criteria as set forth can be difficult to identify. If a selected adhesive is used, the selected adhesive can be difficult to remove from the print bed 160 and can be messy or sticky to walk on.

Although FIG. 10 shows the print bed 160 as defining two vacuum holes 162 for illustrative purposes only, the print bed 160 can define one vacuum hole 162, or any number of uniform and/or different vacuum holes 162, without limitation.

Figure 11:
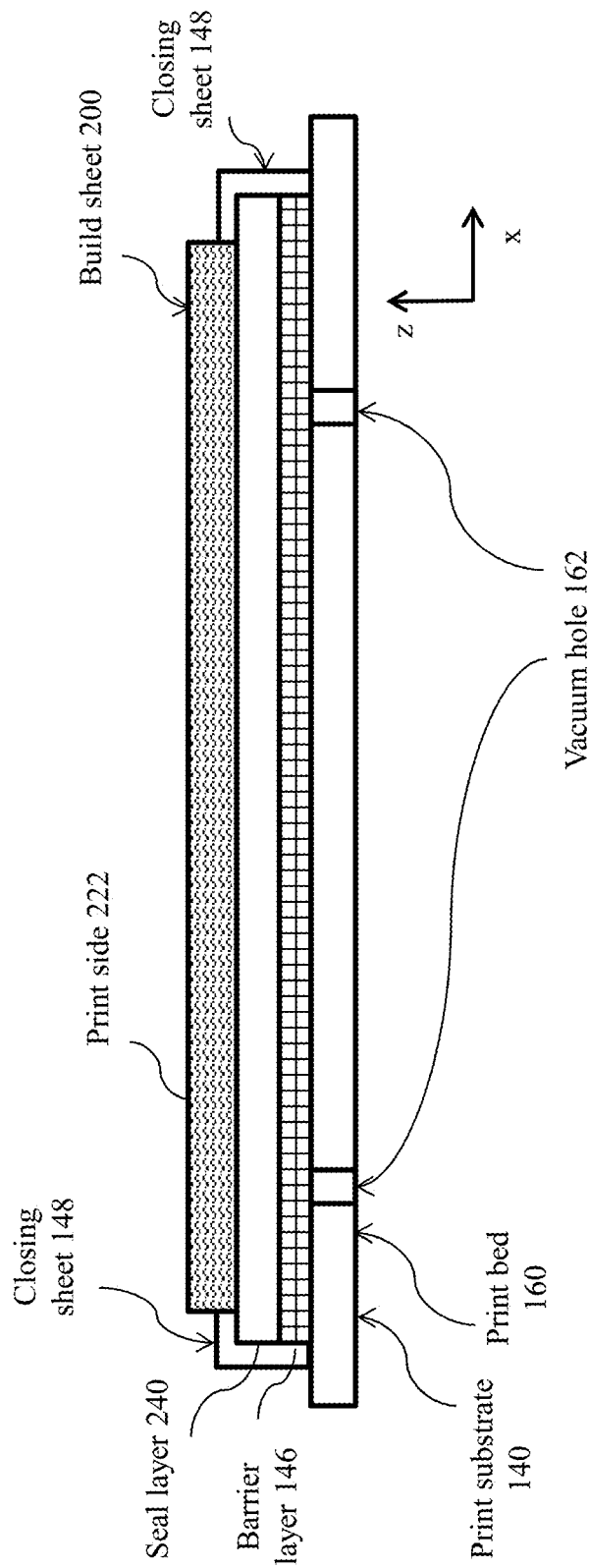
FIG. 11 is an exemplary diagram illustrating an alternative embodiment of the system of FIG. 10, wherein the system includes a barrier layer.

Turning to FIG. 11, a barrier layer 146 is shown as being positioned between the build sheet 200 and the print bed 160. The barrier layer 146 can include one or more layers of gas-permeable materials. An exemplary barrier layer 146 can include wire mesh, filter paper, gas-permeable fiber board, and/or the like. The barrier layer 146 can introduce space between the seal layer 240 and the vacuum hole 162.

The barrier layer 146 can ensure that vacuum is uniformly applied to the entire seal layer 240. In contrast, without the barrier layer 146, the seal layer 240 adjacent to (or proximal to) the vacuum hole 162 may seal the vacuum hole 162 strongly. As a result, the seal layer 240 distal from the vacuum hole 162 may not form vacuum seal or uniform contact with the print bed 160. FIG. 11 shows one or more closing sheets 148 as sealing edges of the barrier layer 146 and the seal layer 240 and fixing the same to the print bed 160. Advantageously, vacuum can be sealed within space defined by the print bed 160, the seal layer 240 and the closing sheets 148. The closing sheet 148 can include any vacuum sealing material. An exemplary closing sheet 148 can include electrical tape and/or duct tape.

In one embodiment, prior to printing, the build sheet 200 and the barrier layer 146 can be positioned on the print bed 160 with the closing sheet 148 being applied. Relative position between the build sheet 200 and the print bed 160 can be fixed by the vacuum and/or the closing sheet 148. By turning off the vacuum and removing the closing sheet 148 from the build sheet 200, the build sheet 200 and the object 180 (shown in FIG. 2) can be released from the print bed 160. Advantageously, setting up the build sheet 200 on the print bed 160 and releasing of the build sheet 200 can be performed in a simple manner.

Figure 12:
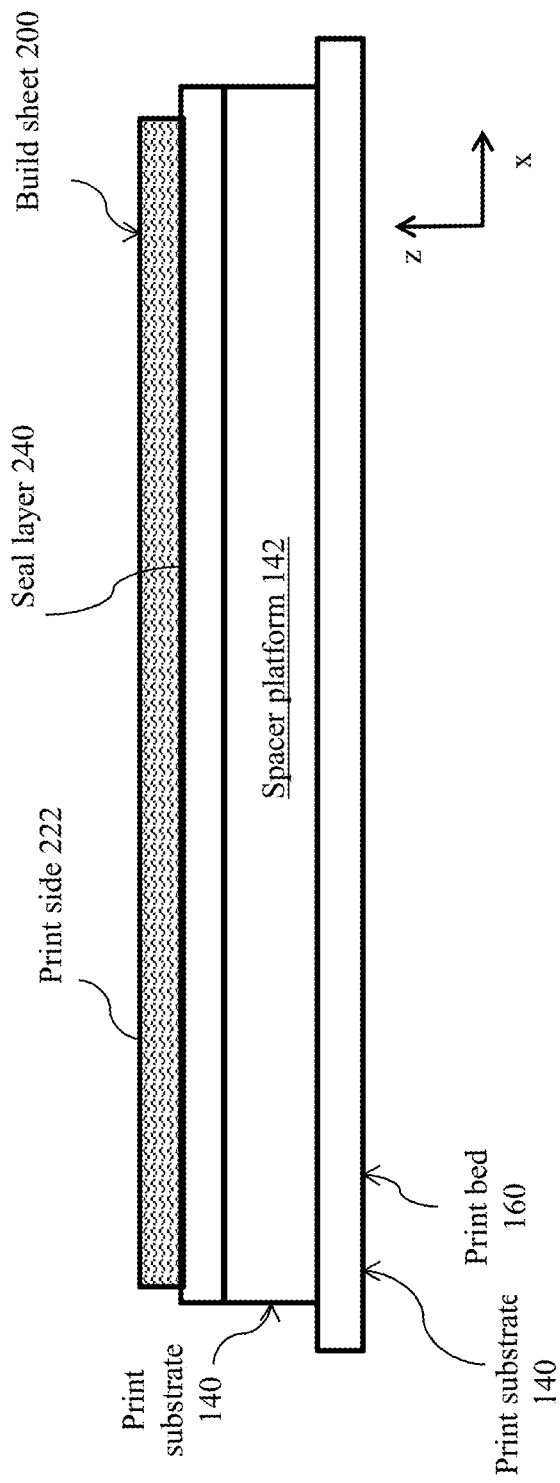
FIG. 12 is an exemplary diagram illustrating an alternative embodiment of the system of FIG. 2, wherein the system includes a spacer platform.

Turning to FIG. 12, the print substrate 140 is shown as including a spacer platform 142 that is positioned between the print bed 160 and the build sheet 200. The spacer platform 142 can be made of any suitable material. An exemplary spacer platform 142 can be made of a medium-density fibreboard (MDF), bead board, concrete, polymer, metal, foam insert, cardboard, low-density fibreboard (LDF), particle board, or a combination thereof. The build sheet 200 can be fixed to the spacer platform 142 in any suitable manner. For example, adhesive tapes and/or vacuum can fix the build sheet 200 to the spacer platform 142.

Additionally and/or alternatively, the spacer platform 142 can be fastened to the print bed 160 in any manner such as via bolting, taping or applying adhesive. Additionally and/or alternatively, the spacer platform 142 can be coupled to the print bed 160 via a mechanical connection such as a cooperating detent including any combination of mating elements, such as blocks, tabs, pockets, slots, ramps, locking pins, cantilevered members, support pins, and the like, that may be selectively or automatically engaged and/or disengaged to couple or decouple the spacer platform 142 and the print bed 160 relative to one another.

Additionally and/or alternatively, the build sheet 200 can be attached to the spacer platform 142 via a layer of adhesive between the build sheet 200 and the spacer platform 142. Thus, the build sheet 200 does not need to include the seal layer 240. By lifting the build sheet 200 off from the spacer platform 142, the build sheet 200 and the object 180 can be released from the spacer platform 142.

In one embodiment, the spacer platform 142 can be used for separating the print bed 160 from the build sheet 200 in any selected manner. The separation can include thermal insulation and/or electric insulation. For example, during printing, the spacer platform 142 can inhibit conduction of heat from the object 180 to the print bed 160. Advantageously, heat can remain in the object 180 longer. Layer-to-layer adhesion in the object 180 can be improved and warp in the object 180 can be reduced.

In another embodiment, the spacer platform 142 can be connected to a heat source (not shown) and be heated by the heat source. Advantageously, the printing can be performed with the print substrate 140 being actively heated even when the print bed 160 is not actively heated.

Optionally, the spacer platform 142 can include porous MDF and/or porous LDF with painted sides that are not in contact with any of the print bed 160 and the build sheet 200. Stated somewhat differently, sides of the spacer platform 142 that are not in z-direction can be painted for preventing vacuum leakage via the sides.

Although FIG. 12 shows the spacer platform 142 as including one layer for illustrative purposes only, the spacer platform 142 can include any number of uniform and/or different stacked layers, without limitation. For example, the spacer platform 142 can include a layer of plywood board in contact with the print bed 160 and an MDF between the plywood board and the build sheet 200. The MDF and the plywood board can be connected via, for example, bolting and/or any cooperating detent.

Although FIG. 12 shows the print bed 160 as defining no vacuum holes 162 (shown in FIG. 11), the print bed 160 can define any number of uniform and/or different vacuum holes 162 and be configured to provide vacuum, without limitation.

Figure 13:
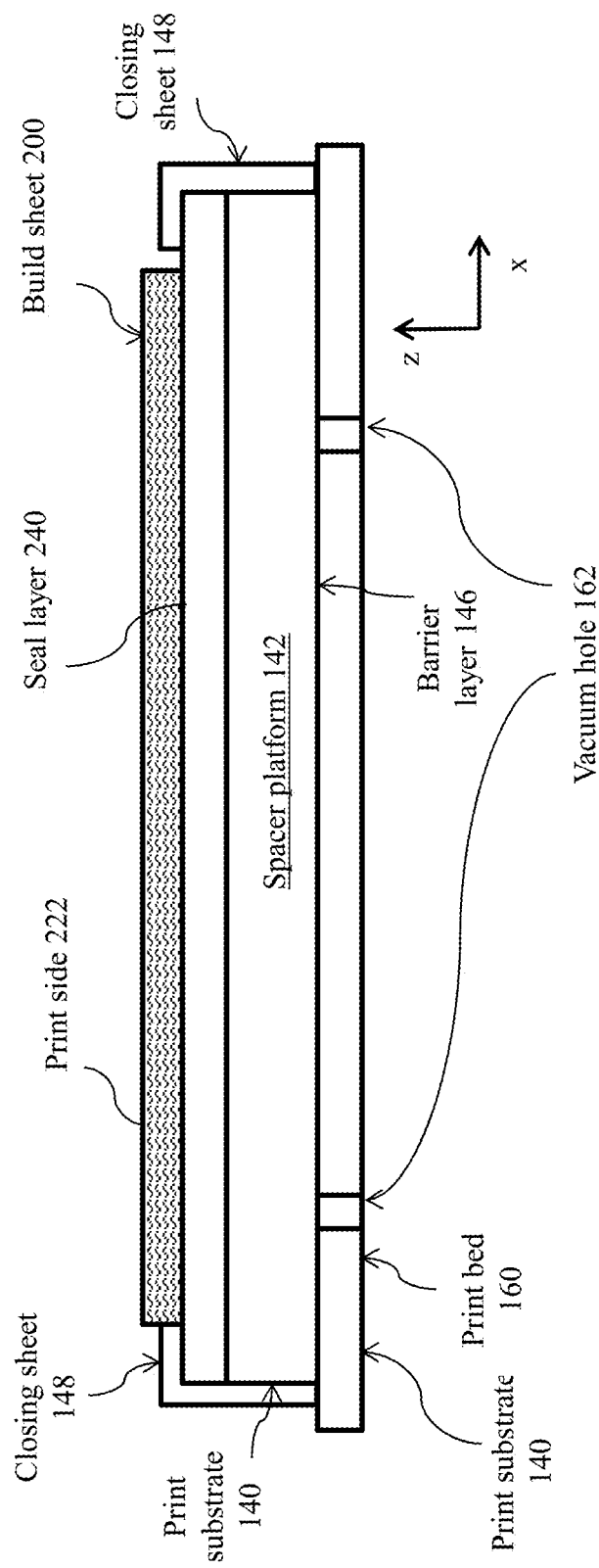
FIG. 13 is an exemplary diagram illustrating an alternative embodiment of the system of FIG. 12, wherein the system is configured to apply a vacuum to the build sheet.

Turning to FIG. 13, one or more closing sheets 148 are shown as sealing edges of the spacer platform 142 and the seal layer 240 and fixing the same to the print bed 160. The print bed 160 is shown as defining the vacuum holes 162. In one embodiment, the spacer platform 142 can be porous and/or permeable to air. The spacer platform 142 can introduce space between the seal layer 240 and the vacuum hole 162. Stated somewhat differently, the barrier layer 146 can include the spacer platform 142 to ensure that vacuum is uniformly applied to the entire seal layer 240. Vacuum can be sealed within space defined by the print bed 160, the seal layer 240 and the closing sheets 148.

Thus, the spacer platform 142 can be fixed to the print bed 160 by the vacuum applied via the vacuum holes 162. Stated somewhat differently, prior to printing, the spacer platform 142 can be positioned on the print bed 160 and the build sheet 200 can be positioned on the spacer platform 142 with the closing sheet 148 being applied.

Relative positions among the build sheet 200, the spacer platform 142 and the print bed 160 can be simultaneously fixed upon application of the vacuum and/or the closing sheet 148. By turning off the vacuum and removing the closing sheet 148 from the build sheet 200, the build sheet 200 and the object 180 (shown in FIG. 2) can be released from the spacer platform 142. Advantageously, setting up the spacer platform 142 and the build sheet 200 on the print bed 160, and releasing of the build sheet 200 can be performed in a simple manner.

Although FIG. 13 shows the spacer platform 142 as being used with the print bed 160 configured for vacuum sealing and as being used with the seal layer 240 for illustrative purposes only, the spacer platform 142 can be used if no vacuum is applied, or if the print bed 160 does not define vacuum holes 162, and/or if the print bed 160 is not capable of applying vacuum.

Figure 14:
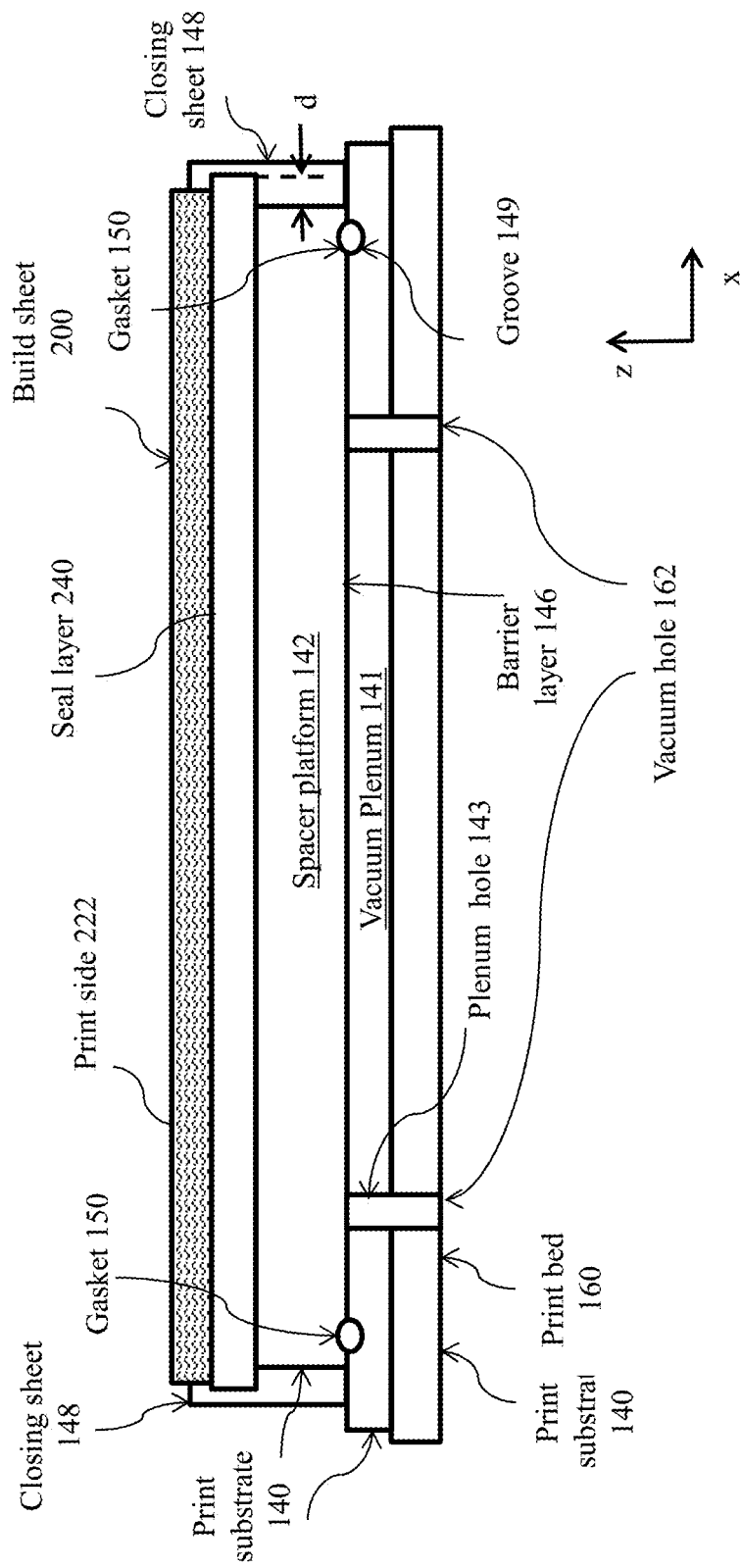
FIG. 14 is an exemplary diagram illustrating another alternative embodiment of the system of FIG. 12, wherein the system includes a vacuum plenum.

Turning to FIG. 14, the print substrate 140 is shown as including a vacuum plenum 141 disposed on the print bed 160. The vacuum plenum 141 can include a platform defining one or more plenum holes 143 communicating with the vacuum holes 162 of the print bed 160. Exemplary vacuum plenum 141 can be made of aluminum, phenolic, or sealed MDF. The vacuum plenum 141 can define one or more grooves 149 thereon. Each selected groove 149 can accommodate a gasket 150 made of, for example, flexible rubber and/or any other elastomer. Exemplary gasket 150 can be deformable. The gasket 150 can at least partially seal vacuum between the vacuum plenum 141 and the spacer platform 142. In one example, the vacuum plenum 141 can be fixed to the print bed 160 via cooperating detent, screwing, taping and/or adhesive.

Optionally, the spacer platform 142 can include porous MDF and/or porous LDF with painted sides that are not in contact with any of the vacuum plenum 141 and the build sheet 200. Stated somewhat differently, sides of the spacer platform 142 that are not in z-direction can be painted for preventing vacuum leakage via the sides. Additionally and/or alternatively, the closing sheet 148 can be applied to the spacer platform 142 and the seal layer 240 for sealing vacuum.

FIG. 14 shows the seal layer 240 as overhanging beyond ends of the spacer platform 142. Stated somewhat differently, the seal layer 240 can extend beyond the spacer platform 142 in x-direction by a distance d. The distance d can be selected such that, even if the seal layer 240 contracts as the seal layer 240 moves with the object 180 (shown in FIG. 2) during warping of the object 180, the distance of contraction can be smaller than the distance d, so the seal layer 240 can still cover the entire spacer platform 142. Advantageously, when the sides of the spacer platform 142 are painted as set forth above, loss of vacuum can be prevented, even if the seal layer 240 and the spacer platform 142 are not sealed with the closing sheet 148.

Although FIG. 14 shows the seal layer 240 as extending beyond the spacer platform 142 in x-direction by the distance d, the seal layer 240 can extend beyond the spacer platform 142 in x-direction, y-direction, or a combination thereof, by any uniform and/or different distances, without limitation.

Figure 15:
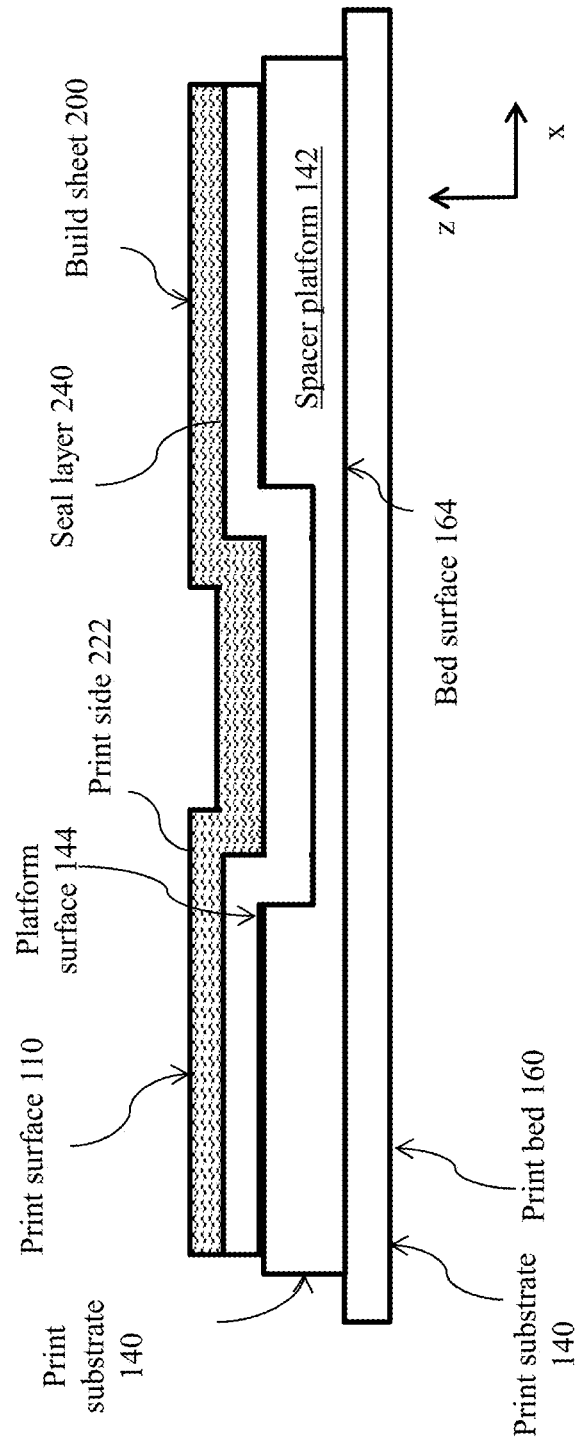
FIG. 15 is an exemplary diagram illustrating another alternative embodiment of the system of FIG. 12, wherein the spacer platform has a non-uniform platform surface.

Turning to FIG. 15, the spacer platform 142 is shown as having a non-uniform thickness. Stated somewhat differently, the spacer platform 142 provides a platform surface 144 that is not flat or is not parallel with the print bed 160. FIG. 15 shows the print bed 160 as having a bed surface 164 that is flat and is vertical to the z-direction. The platform surface 144 is shown as having surface topography that differs from surface topography of the bed surface 164.

FIG. 15 shows the build sheet 200 as conforming to shape of the spacer platform 142. Stated somewhat differently, the build sheet 200 can be flexible and capable of conforming to the platform surface 144 of any shape. The object 180 (shown in FIG. 2) can be printed on the print surface 110 that is non-flat. Advantageously, side of the object 180 in contact with the print surface 110 is not limited to a flat surface and can have any selected geometry.

Although FIG. 15 shows the platform surface 144 as having a rectangular-well-shaped surface contour for illustrative purposes only, the platform surface 144 can have any shapes, without limitation. For example, shape of the platform surface 144 can include rectangle, triangle, zig-zag, saw tooth, curve, or a combination thereof.

Although FIG. 15 shows the print bed 160 as defining no vacuum holes 162 (shown in FIG. 11), the print bed 160 can define any number of uniform and/or different vacuum holes 162, without limitation.

Figure 16:
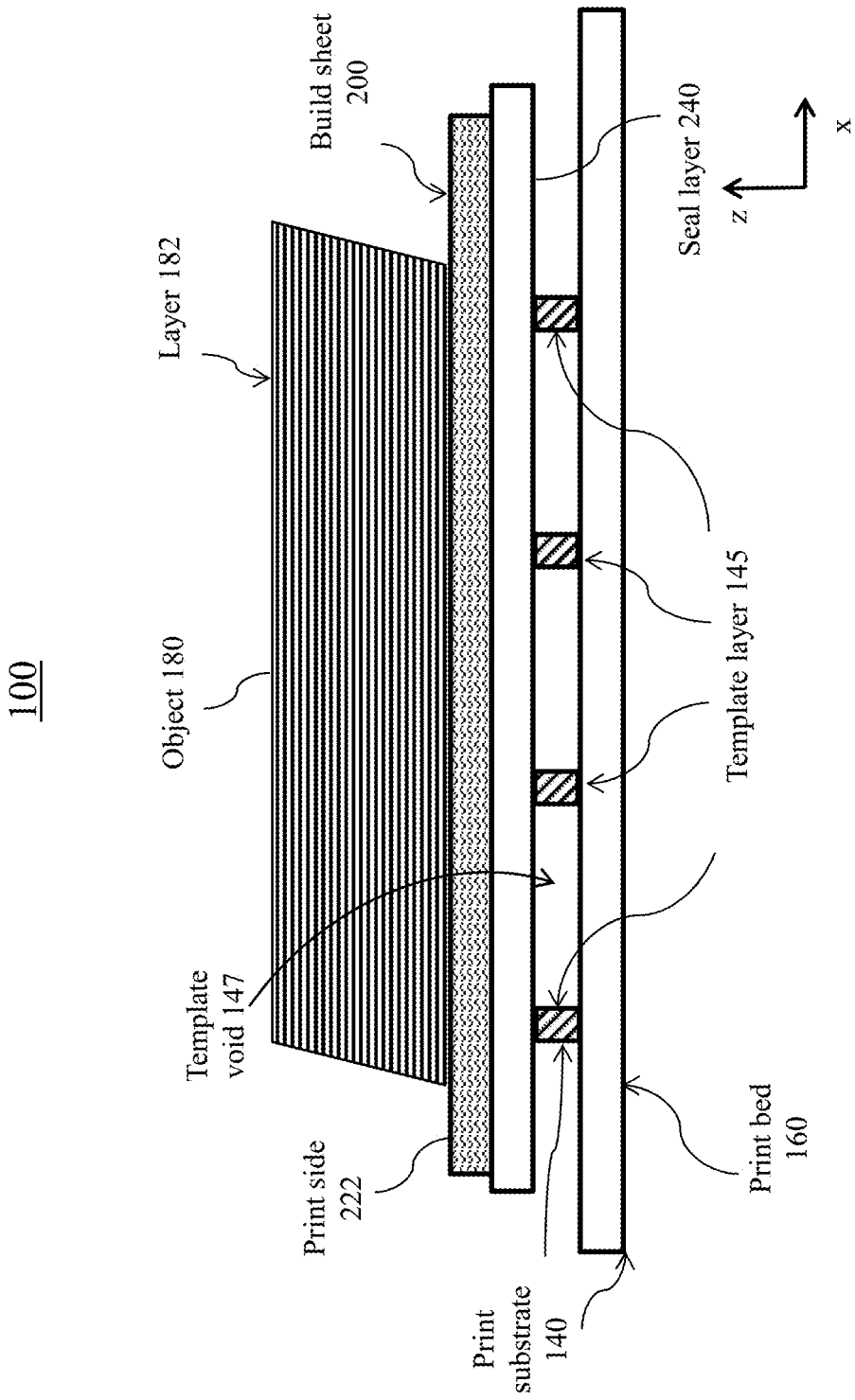
FIG. 16 is an exemplary diagram illustrating another alternative embodiment of the system of FIG. 2, wherein the system includes a template layer.

Turning to FIG. 16, the print substrate 140 is shown as including a template layer 145 located between the build sheet 200 and the print bed 160. Exemplary template layer 145 can include a layer of material that defines template voids 147 (shown in FIG. 17) of selected sizes, shapes, and/or patterns at least partially passing through the template layer 145 in the z-direction. The template voids 147 can provide clearance for the machining tool 130 (shown in FIG. 2) when the machining tool 130 cuts through the object 180 and the build sheet 200 in the z-direction, and/or when the machining tool 130 cuts through an external surface of the object 180 near the layers 182 that are proximal to the print substrate 140.

Although FIG. 16 shows the template layer 145 as being in contact with both of the build sheet 200 and the print bed 160 for illustrative purposes only, additional components of the system 100 can be included between the template layer 145 and the build sheet 200 or between the template layer 145 and the print bed 160, without limitation. For example, the barrier layer 146 (shown in FIG. 11), the spacer platform 142 (shown in FIG. 12), the vacuum plenum 141 (shown in FIG. 14), and/or any other additional and/or alternative layers for sealing vacuum, can be disposed between the template layer 145 and the build sheet 200. Additionally and/or alternatively, the closing sheet 148 (shown in FIG. 13) can be applied at edges of the build sheet 200, the template layer 145 and/or on the print bed 160 for sealing vacuum.

Figure 17:
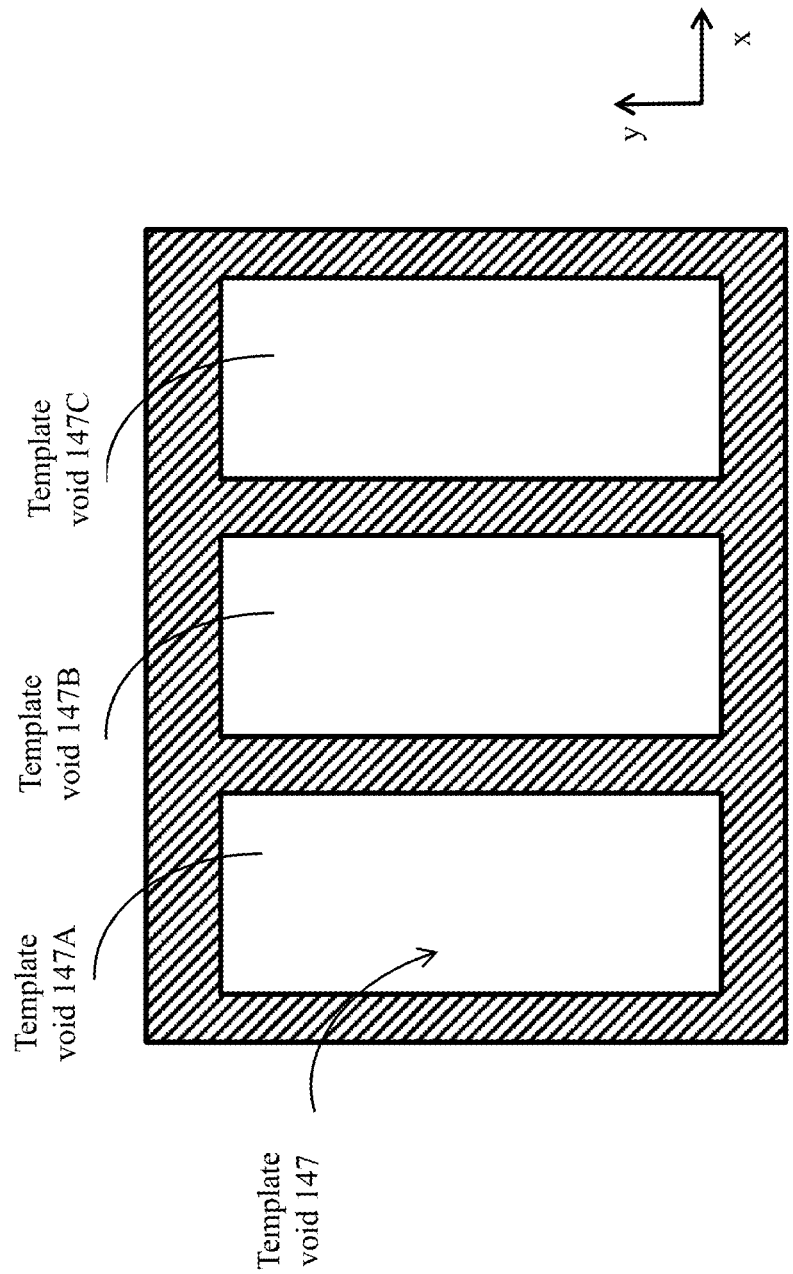
FIG. 17 is an exemplary top view illustrating an alternative embodiment of the template layer of FIG. 16.

Turning to FIG. 17, an exemplary view in the z-direction of an embodiment of the template layer 145 is shown. The template layer 145 can be made of a sheet of material that is cut through via any suitable methods including, for example, laser cutting and/or water jet cutting. Additionally and/or alternatively, the template layer 145 can include one or more stacked sheets made of any suitable material including, for example, MDF sheets. Additionally and/or alternatively, the template layer 145 can be made of additive manufacturing based on, for example, extrusion deposition. Advantageously, the template layer 145 can be made in the system 100 prior to printing of the object 180. Manufacturing process can thus be simplified.

Although FIG. 17 shows the template layer 145 as being rectangular and defining three rectangular template voids 147A-147C for illustrative purposes only, the template layer 145 can be in any shape and can define any number of uniform and/or different template voids 147 having any selected shapes, without limitation.

Figure 18:
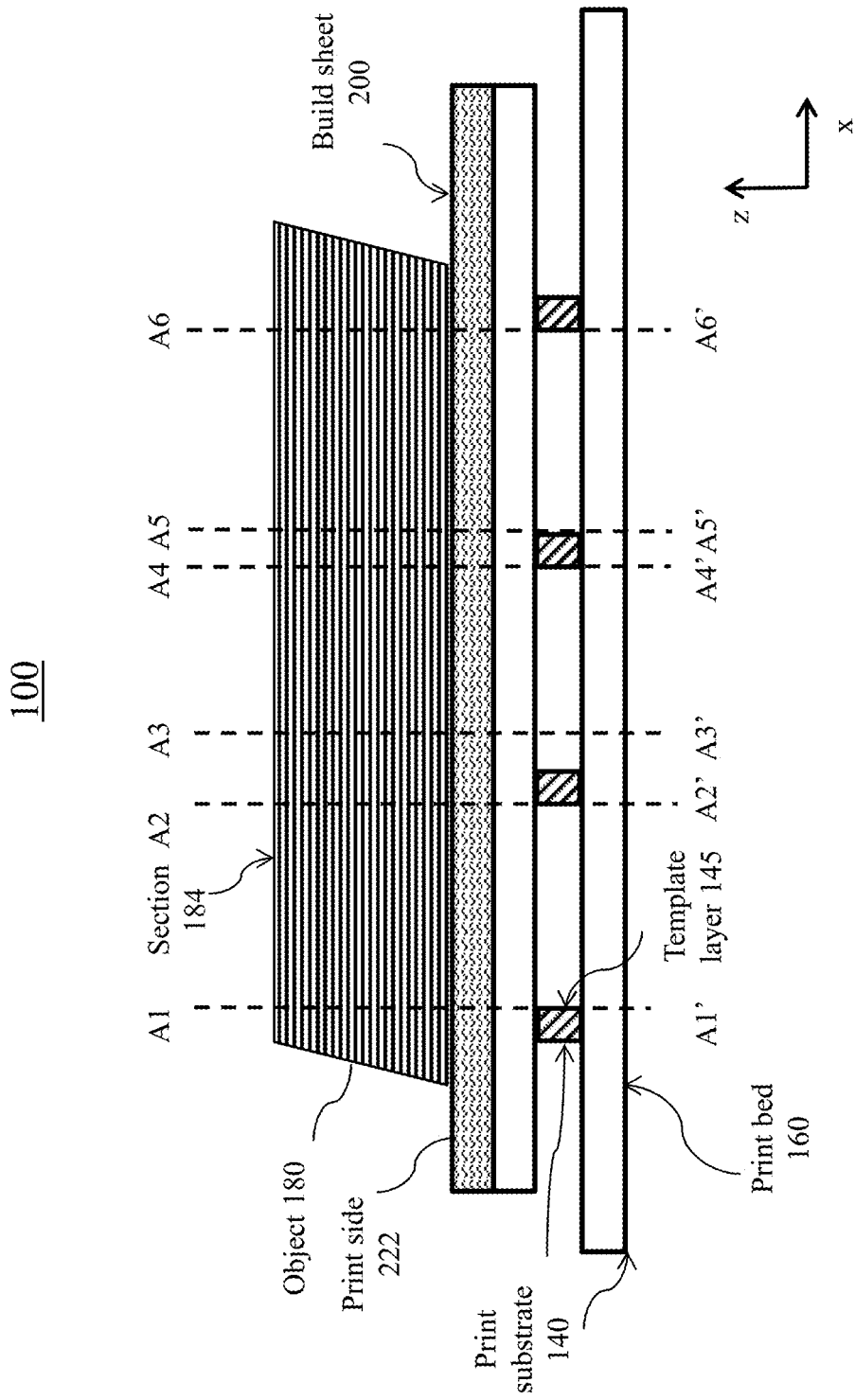
FIG. 18 is an exemplary diagram illustrating another alternative embodiment of the system of FIG. 2, wherein the system is configured for machining.

Turning to FIG. 18, the object 180 is shown as being cut in the z-direction along each of the lines A1A1'-A6A6'. Stated somewhat differently, the object 180 can be cut along lines and/or planes passing through the object 180 and the build sheet 200 and into the template voids 147 in the z-direction. For example, the machining tool 130 (shown in FIG. 2) can cut through the object 180 and the build sheet 200. Because of the template voids 147, the machining tool 130 can avoid damaging the print bed 160 or any other structures below the template voids 147.

The object 180 can thus be cut into a plurality of sections within areas at least partially defined by the lines A1A1'-A6A6'. Upon being cut, each section of the object 180 can be removed from the build sheet 200. Advantageously, after printing, the object 180 can be machined in the system 100, without a need to unload the object 180 from the system 100 and load the object 180 into another machining system. The need of reacquiring positioning information of the object 180 in the machining system can thus be eliminated. Manufacturing process can thus be simplified and accuracy of the machining process can be improved.

Each of A1A1'-A6A6' can be adjacent to edges of a selected template voids 147 and/or be located at a selected distance from the edges of a selected template voids 147. For example, the line A2A2' is shown as being adjacent to an edge of the template void 147A (shown in FIG. 17) while the line A3A3' is shown as being located at a distance from the edge of the template void 147B (shown in FIG. 17).

Turning back to FIG. 7, an exemplary build sheet 200 is shown as including the build surface layer 220. The build surface layer 220 can be made of a material that can be 3D printed. Additionally and/or alternatively, the build surface layer 220 can be made by sheet forming or sheet bonding. Additionally and/or alternatively, the build surface layer 220 can be made of a flexible and/or elastic material, made either by 3D printing or other means including, for example, solution casting and/or electrospinning. In one embodiment, the build surface layer 220 can be at least partially made of thermoplastic polyurethane (TPU). In another embodiment, the build surface layer 220 can be made of polyamide. Exemplary polyamide that can be 3D printed can include Technomelt, available at Henkel AG & Co. KGaA located in Dusseldorf, Germany.

In one embodiment, the build surface layer 220 is made of TPU. TPU can provide strong adhesion that may be partly due to hydrogen bonding of the urethane group and/or surface friction of the TPU surface upon cooling, even though the mechanism of such adhesion properties is not yet well known. The TPU can include, as one example, Ninja-Flex, available at NinjaTek located in Manheim, Pa., United States. Exemplary TPU of NinjaFlex can have an 85A Shore hardness. By using TPU, the adhesion of the build surface layer 220 to the printed object 180 (shown in FIG. 2) can be improved. The build surface layer 220 can adhere strongly enough to the printed 3D object 180 to prevent the 3D object 180 from moving as the 3D object 180 thermally contracts or expands.

Additionally and/or alternatively, when made of a TPU sheet, the build surface layer 220 alone can seal vacuum and can thus attach to the print substrate 140 at least partially via vacuum sealing.

Additionally and/or alternatively, the TPU can include SemiFlex, available at NinjaTek. In an unlimiting example, the TPU of SemiFlex can have a 98 A Shore hardness.

The TPU can be 3D printed with the print bed 160 (shown in FIG. 2) kept at room temperature. Advantageously, because higher operating temperatures place strain on the print bed 160, keeping the print bed 160 at room temperature can extend the life time of the print bed 160 and ease print bed-related procedures performed by an operator. Additionally and/or alternatively, the TPU can be recyclable and result in less environmental waste.

Thickness of an exemplary build surface layer 220 can range from 0.1 mm to 10 mm. The thickness can be selected based on desired properties. For example, a thick build surface layer 220 made of TPU can provide more damping to the system 100 (shown in FIG. 2) and/or be less likely to melt under the heat from the object 180. A thin build surface layer 220 made of TPU can be more easily removed from the object 180 at least partly due to less compliance of a thin TPU layer. In a preferred embodiment, the thickness can range from 1 mm to 8 mm which can provide sufficient flexibility, strength and robustness.

The object 180 has a build interface region 184 (shown in FIG. 2) that contacts the print surface 110 (shown in FIG. 2) during printing. The build surface layer 220 made of TPU can have the print surface 110 that is smooth and have a roughness on the order of nanometers. Upon removal of the object 180 from the build sheet 200, the build interface region 184 can be substantially smooth and can be different from a rough "bead board" surface that has a roughness on the order of millimeters (at least one millimeter, for example).

Upon removal of the object 180 from the build sheet 200, none of, or a small amount of, residual material from the build sheet 200 remains on the object 180. For example, a trace of TPU can remain on the object 180. Stated somewhat differently, the build sheet 200 can remain substantially undamaged during the removal. Advantageously, the object 180 does not require additional cleaning and/or finishing work for removing any residual material, and the build sheet 200 can be ready for reuse.

The build surface layer 220 made of TPU can be removable and/or reusable under selected print conditions. When the initial layer of the object 180 interfaces with the build surface layer 220 at a selected temperature, the surface interaction between the object 180 and the build surface layer 220 can result in an optimal adhesion therebetween. The build surface layer 220 can thus adhere to the object 180 during printing and be removable after the printing. For example, the extrusion temperature can range from 200 degrees C. to 400 degrees C., or preferably from 250 degrees C. to 300 degrees C. Printing at a temperature lower than the selected temperature can result in a lower adhesion and ease removal of the build surface layer 220.

When the initial layer of the object 180 includes multiple beads in contact and/or in parallel, the initial layer can have a greater thermal mass and remain at a high temperature for a longer time. The adhesion between the initial layer and the build surface layer 220 can thus be greater. Accordingly, a smaller number of beads in contact and/or in parallel can result in lower adhesion and ease removal of the build surface layer 220.

Optionally, surface treatment can be applied to alter surface chemistry of the build surface layer 220 such that removal of the object 180 can be easier. Exemplary surface treatment can include any processes that reduce surface reactivity of the build surface layer 220. For example, selected additives in solid, liquid and/or vapor form can be applied to the build surface layer 220.

The build surface layer 220 made of TPU may not be as easily removable from the object 180 under certain print conditions. For example, if the temperature of the polymer is high, or the object 180 includes a thick structure (such as a wall has a multiple-beads width) that retains heat for a long time, or the print time is long such that the print time at the high temperature is long, then the ease of removability of the object 180 from the build sheet 200 may decrease. Even if the build sheet 200 made fully or partially of TPU is not fully removable from the object 180 because of the print conditions, use of the build sheet 200 may be advantageous in several respects: the build sheet 200 can be 3D printed; the print bed 160 can be kept at room temperature; the print surface region can be much smoother than when a rough "bead board" surface is used; the mess associated with the "bead board" surface can be avoided; and even if not fully removable, the build sheet 200 can be quickly set up and the object 180 quickly removed from the build sheet 200 after each print by cutting the object 180 away from the build sheet 200, leaving only a portion of the build sheet 200 adhered to the bottom of the object 180 (shown in FIG. 19). Further, the build surface layer 220 made of TPU may be even more easily removable for smaller-scale additive manufacturing systems because an object can be printed at elevated temperatures for a shorter print time and has a small thermal mass.

Alternatively and/or additionally, the build surface layer 220 can be made of a high temperature elastomer. The high temperature elastomer does not necessarily melt upon deposition, but can have a surface texture that acts to retain the bottom of the object 180. Stated somewhat differently, the high temperature elastomer can be used with a texture that holds the print material without melting and sticking. Exemplary high temperature elastomers can include a fluorocarbon, a silicone, or a combination thereof. For example, the fluorocarbon can include Viton, available at The Chemours Company, located in Wilmington, Del., United States.

Turning back to FIG. 9, an exemplary build sheet 200 is shown as including the optional seal layer 240 attached to the attachment side 224 of the build surface layer 220. Even though the build surface layer 220 can seal vacuum without the seal layer 240, the seal layer 240 can function as a backing layer and advantageously improve mechanical robustness of the build sheet 200. For example, when the build surface layer 220 is thin (for example, less than 3 mm thick), the seal layer 240 can increase thickness of the build sheet 200 and ease handling.

The build surface layer 220 can be attached to the transition layer 280 in any manner. In one embodiment, the build surface layer 220 can be 3D printed on the seal layer 240. Additionally and/or alternatively, the build surface layer 220 can be formed on the seal layer 240 via sheet forming and/or sheet bonding.

Figure 20:
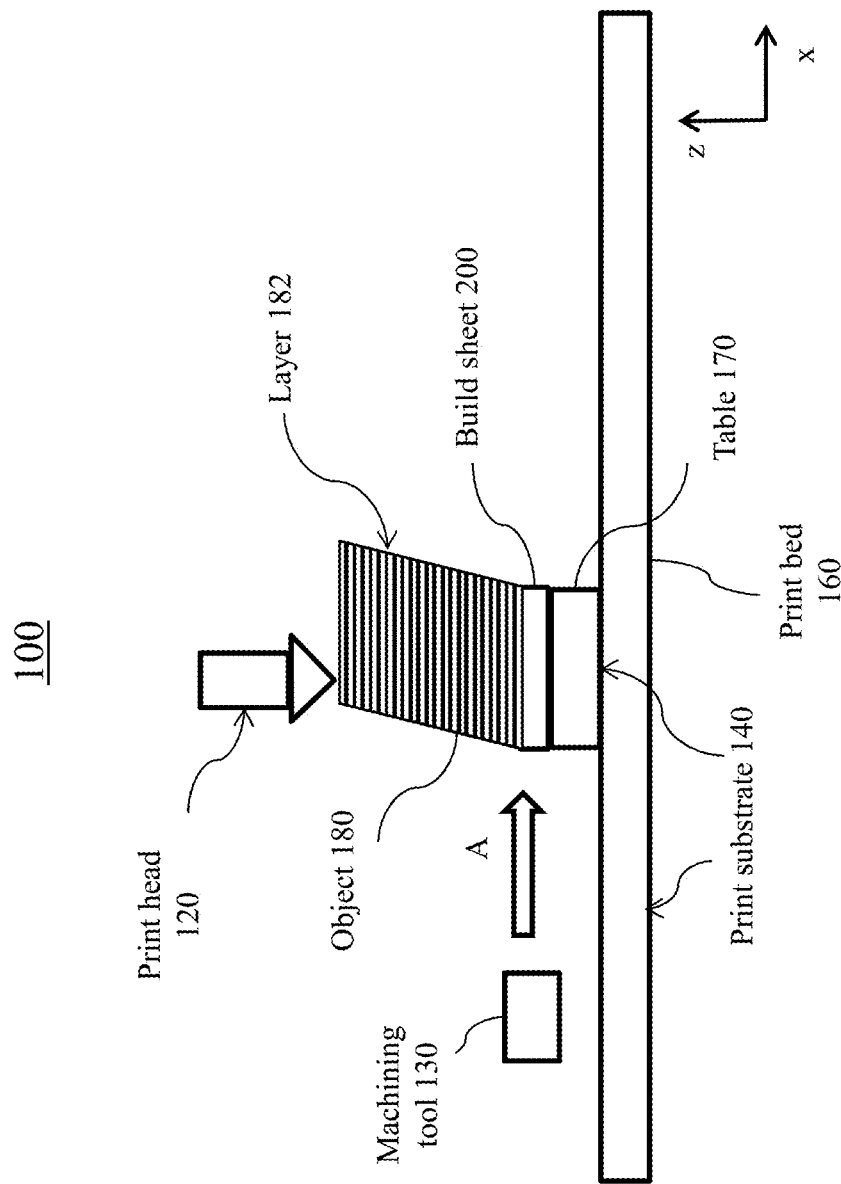
FIG. 20 is an exemplary diagram illustrating another alternative embodiment of the system of FIG. 2 during manufacturing, wherein the build sheet is disposed on a table.

Turning to FIG. 20, the system 100 is shown as further including a table 170 as disposed on the print bed 160. The table 170 can form a part of the print substrate 140. The build sheet 200 is shown as being disposed on the table 170. The table 170 is shown as increasing a distance between the object 180 and the print bed 160. The machining tool 130 is shown as approaching a bottom of the object 180 to machine and/or mill a bottom of the object 180. Stated somewhat differently, the machining tool 130 is shown as moving toward a portion of the object 180 proximal to the print bed 160 in a direction A. The height of the table 170 provides clearance for the machining tool 130 and prevents the machining tool 130 from hitting the print bed 160.

The table 170 can be made with any suitable materials and/or processes. In one embodiment, the table 170 can be 3D printed in the system 100 and, for example, made of polycarbonate and/or ABS. In this embodiment, the table 170 can include one or more polycarbonate layers stacked in the z direction. Advantageously, the table 170 can be 3D printed to match a size, shape and/or dimension of the object 180. Thus, the machining tool 130 can access the object 180 without being blocked by any part of the table 170 extending beyond edges of the object 180.

The build sheet 200 can be made in any suitable manner. For example, the build sheet 200 can be made of TPU and be 3D printed, and may include one or more TPU layers stacked in the z direction. Advantageously, the build sheet 200 can precisely cover the table 170 even if the table 170 has complex geometry. The build sheet 200 can match the size, shape and/or dimension of the object 180 and thus make the machining process cleaner and more efficient. In contrast, if an alternative structure (such as plywood or bead board) is used in place of the build sheet 200, the structure may not be easily machined to match the geometry of the object 180. If the structure is oversized relative to the object 180, the machining tool 130 tends to machine off much of the structure and result in mess and pollution (such as sawdust).

Figure 21:
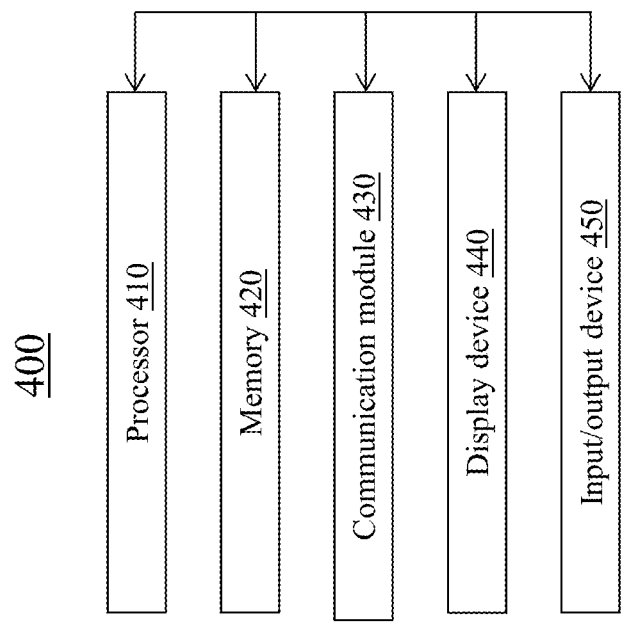
FIG. 21 is an exemplary diagram illustrating an embodiment of a control system for controlling the system of FIG. 1.

Turning to FIG. 21, a control system 400 for additive manufacturing is shown. The control system 400 can be configured for controlling the print head 120 (shown in FIG. 2) and/or the machining tool 130 (shown in FIG. 2). The control system 400 can include a processor 410. The processor 410 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 410 can execute instructions for implementing the control system 400 and/or computerized model of the object 180 (shown in FIG. 2). In an un-limiting example, the instructions include one or more additive manufacturing software programs. The programs can operate to control the system 100 (shown in FIG. 2) with multiple printing options, settings and techniques for implementing additive printing of large components.

The programs can include a computer-aided design (CAD) program to generate a 3D computer model of the object 180. Additionally and/or alternatively, the 3D computer model can be imported from another computer system (not shown). The 3D computer model can be solid, surface or mesh file format in an industry standard.

The programs can load the 3D computer model, create a print model and generate the machine code for controlling the system 100 to print the object 180. Exemplary programs can include LSAM Print 3D, available from Thermwood Corporation located in Dale, Ind. Additionally and/or alternatively, exemplary programs can include Unfolder Module Software, Bend Simulation Software, Laser Programming and/or Nesting Software available from Cincinnati Incorporated located in Harrison, Ohio.

The control system 400 is shown as including one or more additional hardware components as desired. Exemplary additional hardware components include, but are not limited to, a memory 420 (alternatively referred to herein as a non-transitory computer readable medium). Exemplary memory 420 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 400 and/or computerized model of the object 180 can be stored on the memory 420 to be executed by the processor 410.

Additionally and/or alternatively, the control system 400 can include a communication module 430. The communication module 430 can include any conventional hardware and software that operates to exchange data and/or instruction between the control system 400 and another computer system (not shown) using any wired and/or wireless communication methods. For example, the control system 400 can receive computer-design data corresponding to the object 180 via the communication module 430. Exemplary communication methods include, for example, radio, Wireless Fidelity (Wi-Fi), cellular, satellite, broadcasting, or a combination thereof.

Additionally and/or alternatively, the control system 400 can include a display device 440. The display device 440 can include any device that operates to present programming instructions for operating the control system 400 and/or present data related to the print head 120. Additionally and/or alternatively, the control system 400 can include one or more input/output devices 450 (for example, buttons, a keyboard, keypad, trackball), as desired.

The processor 410, the memory 420, the communication module 430, the display device 440, and/or the input/output device 450 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for additive manufacturing, comprising:
    positioning a build sheet on a print substrate of a printer, the print substrate including a barrier layer, the barrier layer including a spacer platform that defines a platform surface having a cross-sectional shape of a well, the build sheet conforming to the platform surface, wherein the print substrate further includes a template layer disposed between the spacer platform and the build sheet, the template layer defining one or more template voids passing through the template layer in a stacking direction of the printer;
    printing an object on the build sheet; and
    detaching the object from the build sheet after completion of said printing, wherein the build sheet includes a build surface layer configured to at least partially adhere to the object during said printing, wherein the build surface layer is configured to be removable from the object after printing.

2. The method of claim 1, wherein the printer is a large-scale additive manufacturing system.

3. The method of claim 1, wherein the build sheet is flexible.

4. The method of claim 1, wherein the build sheet is at least partially made of thermoplastic polyurethane.

5. The method of claim 1, wherein the build sheet is at least partially made of a textile.

6. The method of claim 5, further comprising coating, before said positioning, the build surface layer with an adhesive including a contact adhesive, a wood glue, or a combination thereof.

7. The method of claim 1, wherein said printing the object includes printing the object at least partially made of acrylonitrile butadiene styrene (ABS), polycarbonate, or a combination thereof.

8. The method of claim 1, wherein said positioning includes printing the build sheet on the print substrate by using the printer.

9. The method of claim 1, wherein the print substrate includes a table disposed on the print substrate, the method further comprising printing the table on the print substrate by using the printer.

10. The method of claim 1, wherein the build sheet further includes a seal layer attached to the build surface layer and proximal to the print substrate.

11. The method of claim 10, wherein the seal layer is adapted for sealing vacuum.

12. The method of claim 10, further comprising attaching the seal layer to the build surface layer via adhesive or heat press.

13. The method of claim 10, wherein the print substrate includes a print bed, and the method further comprises fixing, before said printing, the build sheet to the print substrate via vacuum applied via the print bed.

14. The method of claim 13, further comprising releasing, after said printing the object, the build sheet and the object from the print substrate by turning off the vacuum.

15. The method of claim 13, wherein the barrier layer is gas-permeable.

16. The method of claim 15, wherein the barrier layer includes a wire mesh, a gas-permeable fiber board, or a combination thereof.

17. The method of claim 1, wherein the build surface layer is between 1 millimeter and 10 millimeters thick, wherein the build surface layer has a print surface that has a roughness of less than 1 millimeter, or wherein the adhesion between the build sheet and the object has a peel strength between 10 and 1000 pound force/inch.

18. The method of claim 1, further comprising cutting the object into a plurality of sections shaped at least partially based on geometry of the template voids.

19. A method for additive manufacturing, comprising:
    positioning a build sheet on a print substrate of a printer, the print substrate including a spacer platform that receives the build sheet, the spacer platform defining a platform surface that has a cross-sectional shape of a well, the build sheet conforming to the platform surface, wherein the print substrate further includes a template layer disposed between the spacer platform and the build sheet, the template layer defining one or more template voids passing through the template layer in a stacking direction of the printer;
    printing an object on the build sheet;
    cutting the build sheet along an edge of the object such that a portion of the build sheet attached to the object is cut from the build sheet;
    detaching, from the print substrate, the object and the portion of the build sheet attached to the object; and
    detaching the object from the portion of the build sheet, wherein the build sheet includes a build surface layer at least partially made of thermoplastic polyurethane and configured to at least partially adhere to the object during said printing.

20. A method for additive manufacturing, comprising:
    positioning a build sheet on a print substrate of a printer, the print substrate including a barrier layer, the barrier layer including a spacer platform that defines a platform surface having a cross-sectional shape of a well, the build sheet conforming to the platform surface, wherein the print substrate further includes a template layer disposed on the spacer platform, the template layer defining one or more template voids passing through the template layer in a stacking direction of the printer;
    printing an object on the build sheet;

cutting the object into a plurality of sections shaped at least partially based on the geometry of the template voids; and detaching the object from the build sheet after completion of said printing, wherein the build sheet includes a build surface layer configured to at least partially adhere to the object during said printing, wherein the build surface layer is configured to be removable from the object after printing.

* * * * *